US009518762B2

(12) United States Patent
Hatada et al.

(10) Patent No.: US 9,518,762 B2
(45) Date of Patent: Dec. 13, 2016

(54) HOT WATER SUPPLY SYSTEM, WATER HEATER AND HOT WATER SUPPLY CONTROL METHOD

(71) Applicant: PURPOSE CO., LTD., Fuji-shi, Shizuoka (JP)

(72) Inventors: Yasutaka Hatada, Fuji (JP); Kazuhiko Nakagawa, Fuji (JP); Katumi Naitoh, Fuji (JP)

(73) Assignee: PURPOSE CO., LTD., Fuji-shi (JP)

( * ) Notice: Subject to any disclaimer, the term of this patent is extended or adjusted under 35 U.S.C. 154(b) by 0 days.

(21) Appl. No.: 14/479,058

(22) Filed: Sep. 5, 2014

(65) Prior Publication Data

US 2014/0379147 A1 Dec. 25, 2014

Related U.S. Application Data

(62) Division of application No. 13/036,560, filed on Feb. 28, 2011, now Pat. No. 8,868,251.

(30) Foreign Application Priority Data

Dec. 2, 2010 (JP) .................................. 2010-269783

(51) Int. Cl.
*G06F 19/00* (2011.01)
*F24H 9/20* (2006.01)
(Continued)

(52) U.S. Cl.
CPC ......... *F24H 9/2007* (2013.01); *F24D 17/0026* (2013.01); *F24D 19/1051* (2013.01);
(Continued)

(58) Field of Classification Search
CPC ............. F24D 17/0031; F24D 19/1006; G05B 2219/2642; Y02B 30/14; F24H 9/2007
See application file for complete search history.

(56) References Cited

U.S. PATENT DOCUMENTS 5,446,846 A * 8/1995 Lennartsson .................. 710/100
6,536,678 B2 * 3/2003 Pouchak .................. F23N 5/203
237/2 A
(Continued)

FOREIGN PATENT DOCUMENTS

EP 1393034 B1 * 12/2007 ............. G05B 15/02
JP 1-141440 A 6/1989
(Continued)

OTHER PUBLICATIONS

Japanese Office Action dated Jul. 8, 2014, issued in corresponding Japanese Patent Application No. 2010-269783 with partial English translation(6 pages).
(Continued)

*Primary Examiner* — Darrin Dunn
(74) *Attorney, Agent, or Firm* — Westerman, Hattori, Daniels & Adrian, LLP

(57) ABSTRACT

A hot water supply system includes a plurality of water heaters, one of which is designated as a master, and the rest(s) of which is/are designated as (a) slave(s). A control unit that is provided for each of the water heaters operates a water heater, for which the control unit is provided, as the master or the slave, the master controls the slave(s), and master and the slave(s) control hot water supply.

7 Claims, 14 Drawing Sheets

(51) Int. Cl.
*F24H 1/10* (2006.01)
*F24D 17/00* (2006.01)
*F24D 19/10* (2006.01)
*G05B 15/02* (2006.01)
*G05D 27/02* (2006.01)

(52) U.S. Cl.
CPC ............ *F24H 1/10* (2013.01); *F24H 9/2035* (2013.01); *G05B 15/02* (2013.01); *G05D 27/02* (2013.01); *F24D 2200/043* (2013.01); *Y10T 137/0318* (2015.04)

(56) References Cited

U.S. PATENT DOCUMENTS

| | | | |
|---|---|---|---|
| 7,529,593 B2 | 5/2009 | Kitagawa et al. | |
| 7,587,465 B1 * | 9/2009 | Muchow | G06F 9/5061 709/208 |
| 7,814,869 B2 | 10/2010 | Tateyama | |
| 8,235,707 B2 * | 8/2012 | Kim | 431/12 |
| 8,371,252 B1 * | 2/2013 | Paine | F24H 9/2035 122/448.3 |
| 2004/0176858 A1 * | 9/2004 | Kuwahara et al. | 700/9 |
| 2005/0065619 A1 * | 3/2005 | Kim et al. | 700/3 |
| 2005/0274328 A1 | 12/2005 | Baese et al. | |
| 2007/0067047 A1 * | 3/2007 | Kitagawa et al. | 700/3 |
| 2007/0144458 A1 * | 6/2007 | Mukomilow | 122/493 |
| 2007/0295823 A1 * | 12/2007 | Yamada | F24H 9/2007 237/7 |
| 2007/0295830 A1 * | 12/2007 | Cohen | F24D 12/02 237/8 A |
| 2008/0022946 A1 | 1/2008 | Inami et al. | |
| 2010/0122668 A1 | 5/2010 | Ando | |
| 2010/0198417 A1 | 8/2010 | Deivasigamani et al. | |
| 2010/0330512 A1 * | 12/2010 | Kim | F24H 9/2042 431/12 |
| 2012/0191259 A1 * | 7/2012 | Deivasigamani et al. | 700/282 |

FOREIGN PATENT DOCUMENTS

| | | |
|---|---|---|
| JP | 2002-357361 A | 12/2002 |
| JP | 2005-61666 A | 3/2005 |
| JP | 2005-106357 A | 4/2005 |
| JP | 2007-078327 A | 3/2007 |
| JP | 2007-132576 A | 5/2007 |

OTHER PUBLICATIONS

U.S. Office Action dated Feb. 15, 2013, issued in related U.S. Appl. No. 13/036,560 (22 pages).

U.S. Office Action dated Sep. 13, 2013, issued in related U.S. Appl. No. 13/036,560 (29 pages).

\* cited by examiner

FIG.4

MANAGEMENT DATA 112

| | | 1 | 2 | 3 | 4 | .... | N |
|---|---|---|---|---|---|---|---|
| 114 | ①DEVICE NUMBER (WHEN NOT CONNECTED: " 0 " ) | 1 | 2 | 3 | 0 | .... | 0 |
| 116 | ②PRIORITY DEVICE FLG (0: NON-PRIORITY, 1: PRIORITY) | 1 | 0 | 0 | 0 | .... | 0 |
| 118 | ③OPERATING FLG (0: STOP, 1: OPERATE: OTHER: ANOMALY) | 1 | 1 | 0 | 0 | .... | 0 |
| 120 | ④CONTINUOUS OPERATING TIME | | | | | | |
| 122 | ⑤CUMULATIVE OPERATING TIME | | | | | | |
| 124 | ⑥ELAPSED TIME AFTER STOP | | | | | | |

HOT WATER SUPPLY SYSTEM, WATER HEATER AND HOT WATER SUPPLY CONTROL METHOD

CROSS-REFERENCE TO RELATED APPLICATIONS

This is a division of application Ser. No. 13/036,560, filed on Feb. 28, 2011, which is based upon and claims the benefit of priority of Japanese Patent Application No. 2010-269783, filed on Dec. 2, 2010, the contents of which are hereby incorporated by reference.

BACKGROUND OF THE INVENTION

1. Field of the Invention

The present invention relates to a hot water supply system of connecting a plurality of water heaters, setting a priority device from the water heaters, and performing hot water supply operation while the priority device links with some of the other water heaters, a water heater therefor and a hot water supply control method therefor.

2. Description of Related Art

Conventionally, there is an art of connecting a plurality of water heaters and performing the hot water supply operation.

An example of performing hot water supply using connected water heaters like the above is that a connecting unit is connected to a hot-water supplier capable of being operated by one set individually; when a control unit of the hot-water supplier detects the connection of the connecting unit, the control unit switches the operation mode of the hot-water suppliers from an individual operation mode into a connecting operation mode automatically (for example, Japanese Laid-open Patent Publication No. 2002-357361).

Another example thereof is that two hot water supply equipments are connected via a communication cable, and an anomaly in one hot water supply equipment is notified at the other hot water supply equipment (for example, Japanese Laid-open Patent Publication No. 2007-078327).

When many, for example, at least three water heaters are connected and the hot water supply operation is performed, a connecting unit for controlling the hot water supply operation is separately provided in order that the operation of each water heater is linked with each other. In a hot water supply system like the above, it is possible to obtain so much hot water that a single water heater cannot obtain. However, newly disposing the connecting unit causes an increase in cost. Further, a place for the connecting unit is needed.

Also, the number of connectable water heaters is limited when the connecting unit is not provided, water heaters are connected to each other directly, one is treated as a master and the others are treated as slaves for example, and the hot water supply operation using the linked water heaters is controlled.

Concerning such problems, there is no disclosure or suggestion thereof in Japanese Laid-open Patent Publications Nos. 2002-357361 and 2007-078327, and no disclosure or suggestion about structure etc. for solving them is presented.

BRIEF SUMMARY OF THE INVENTION

An object of the present invention is to achieve simplification of a hot water supply system by a plurality of water heaters to be linked to result being controllable without using a control device for controlling the hot water supply system.

Another object of the present invention is to prevent interruption to the hot water supply operation due to occurrence of an anomaly in a water heater etc. to improve the convenience of the hot water supply operation.

According to an aspect of the present invention, for example, a hot water supply system includes a plurality of water heaters that are connected to water supply pipe and a hot water supply pipe, one of the water heaters is designated as a master, and the rest(s) of the water heaters is/are designated as (a) slave(s). A control unit that is provided for each of the water heaters operates the water heater, for which the control unit is provided, as the master or the slave, the control unit controls the rest(s) of the water heaters, which is/are designated as the slave(s), when operating as the master, and the master and the slave(s) control hot water supply thereof, respectively.

BRIEF DESCRIPTION OF THE SEVERAL VIEWS OF THE DRAWINGS

FIG. 4 depicts an example of management data of the hot water supply system;

DETAILED DESCRIPTION OF THE INVENTION

First Embodiment

Figure 1:
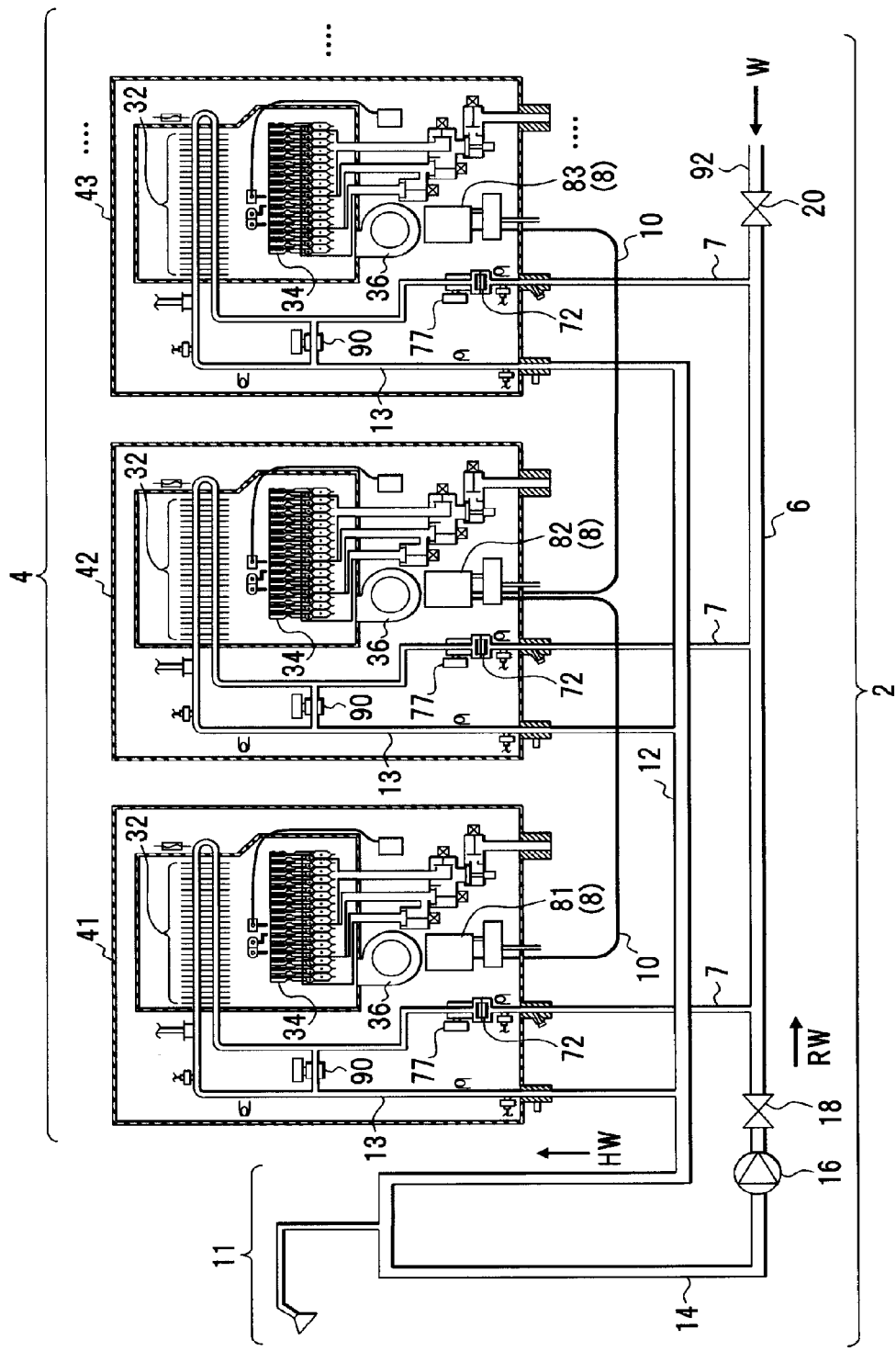
FIG. 1 depicts an example of structure of a hot water supply system according to a first embodiment.
Figure 2:
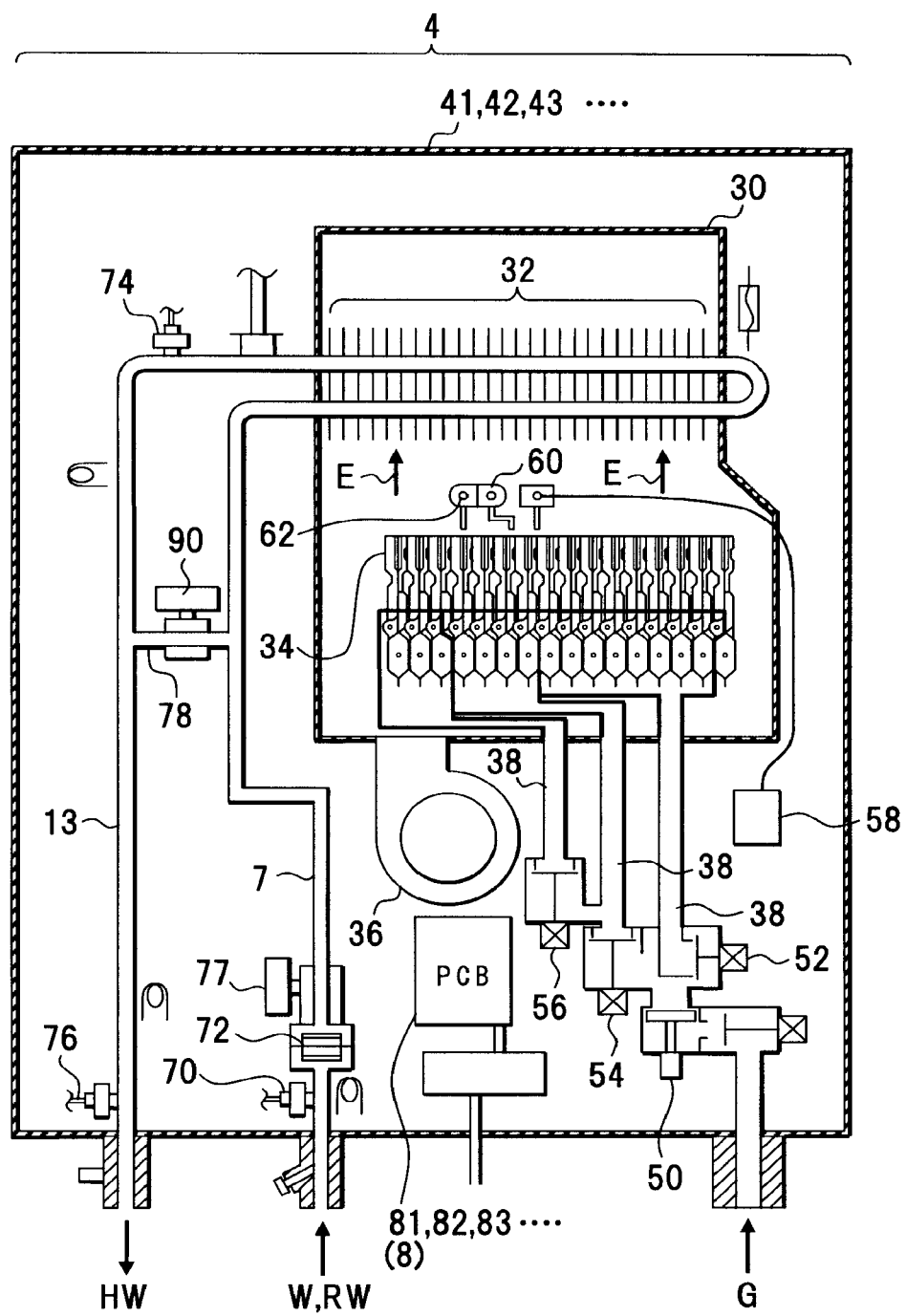
FIG. 2 depicts an example of structure of a water heater.

A first embodiment will be described with reference to FIGS. 1 and 2. FIG. 1 depicts an example of structure of a hot water supply system according to the first embodiment, and FIG. 2 depicts an example of structure of a water heater. Each structure depicted in FIGS. 1 and 2 is an example, and the present invention is not limited thereto.

This hot water supply system 2 is an example of the hot water supply system and the water heater of the present disclosure. For example, the hot water supply system 2 is a means for connecting a plurality of water heaters 4 (41, 42, 43 . . . ) in parallel via a water supply pipe 6, heating supplied tap water W etc., and supplying the heated tap water W etc. The same or equivalent water heaters may be disposed as the water heaters 42, 42, 43 . . . . Water heaters that can be controlled by hot water supply control information may also be disposed even if having different structures. In this hot water supply system 2, control device 8 (81, 82, 83 . . . ) of each water heater 41, 42, 43 . . . is connected with each other by a communication means, and a multi unit system for supplying much hot water is constituted of the combination of a plurality of the water heaters 4.

The control device 8 is an example of a control unit that controls the hot water supply system 2 and the water heater 4, and constitutes the control device 81, 82, 83 . . . that is disposed in each water heater 41, 42, 43 . . . . The control device 81, 82, 83 . . . may control the hot water supply operation of, for example, each water heater 41, 42, 43 . . . according to the flow rate of the supplied tap water W etc. In operation control of the hot water supply system 2, as described below, a control device of a water heater, which is set for the priority device, functions as the control device 8, links the control devices 81, 82, 83 . . . , and controls operation of the water heaters 41, 42, 43 . . . and stop thereof.

This hot water supply system 2 includes the water supply pipe 6, a communication line 10, a hot water supply pipe 12 that introduces hot water HW which is heated by the water heater 4 to a hot water supply load 11, a circulation line 14 that introduces return water RW to a water supply side, a circulation pump 16 and check valves 18 and 20. The multi unit system for supplying much hot water may be constituted without the circulation line 14, the circulation pump 16, the check valve 18 and the return water RW.

The water heater 4 (41, 42, 43 . . . ) is an example of a hot water supply means of the present invention, and is a means for exchanging heat of water, supplied into an inlet side, for combustion exhaust E that is generated by combustion of fuel gas G etc. to heat the supplied water, and supplying the hot water HW. In the water heater 4 depicted in FIG. 2, water is supplied into a combustion chamber 30 via a water supply pipe 7 that is a water flow means. In the combustion chamber 30, a heat exchanger 32 is connected to the water supply pipe 7, and a hot water outgoing pipe 13 is connected to the heat exchanger 32. The combustion chamber 30 includes, for example, a burner 34 and a fan motor 36, and in the combustion chamber 30, a gas supply pipe 38, a gas proportional valve 50, gas solenoid valves 52, 54 and 56 etc. are disposed. An igniter 58, a flame rod 60, an air-fuel ratio flame rod 62, etc. may be provided for the water heater 4. The water heaters 41, 42, 43 . . . provide the control devices 81, 82, 83 . . . , respectively, each of which is constituted of, for example, a PCB (Print Circuit Board).

The water supply pipe 7 includes, for example, an inlet temperature sensor 70, a flow sensor 72 and a flow adjustment valve 77. In the hot water outgoing pipe 13, an output temperature sensor 74 and a mixing temperature sensor 76 are disposed. Between the water supply pipe 7 and the hot water outgoing pipe 13, a bypass 78 and a bypass valve 90 are provided for letting supplied water bypath the heat exchanger 32.

The heat exchanger 32 is an example of a heat exchange means for exchanging heat of supplied water for the combustion exhaust E generated by the burner 34.

The burner 34 is an example of a combustion means, and for example, combusts the fuel gas G supplied from the gas supply pipe 38 to generate the combustion exhaust E.

The fan motor 36 is a means for introducing taken air to the burner 34.

The gas supply pipe 38 is an example of a supply means of the fuel gas G to the burner 34, and includes the gas proportional valve 50 and the gas solenoid valves 52, 54 and 56. The supply of fuel to the burner 34 is controlled by opening and closing of each of these valves.

The inlet temperature sensor 70 is an example of a means for detecting temperature of the tap water W supplied to each water heater 41, 42, 43 . . . and temperature of the return water RW. The output temperature sensor 74 is an example of a means for detecting temperature of hot water after the heat exchange. The mixing temperature sensor 76 is an example of a means for detecting temperature of the hot water HW that is mixture of the supplied water before heating, which flows into the hot water outgoing pipe 13 via the bypass 78, and heated hot water. In the hot water supply control, the required quantity of heat etc. may be calculated using temperature of this supplied water or temperature which is detected after the heat exchange, and the combustion of the burner 34 etc. may be determined. These inlet temperature sensor 70, output temperature sensor 74 and mixing temperature sensor 76 may be means for detecting temperature, and for example, a thermistor thermometer etc. may be used for each sensor. The combustion may be calculated using any of the above flow rate of incoming water, temperature of this supplied water and temperature which is detected after the heat exchange.

The flow sensor 72 is an example of a means for detecting water supplied to each water heater 41, 42, 43 . . . and detecting the flow rates of the supplied tap water W and return water RW. In the hot water supply control, for example, detecting incoming water by this flow sensor 72 allows the hot water supply control to operate. The mixture ratio may be adjusted by the adjustment of the supply of the fuel gas G or the adjustment of the degree of the opening of the bypass valve 90 so that the temperature detected by the mixing temperature sensor 76 is equal to predetermined temperature or preset temperature.

The flow adjustment valve 77 is an example of a water flow means (water flow valve) for controlling the supply of outgoing hot water from each water heater 41, 42, 43 . . . to control the flow rate so that the flow rate does not go beyond the hot water supply capacity. For example, the supply of water to the water supply pipe 7 or the combustion of the burner 34 may be controlled according to the degree of the opening of the flow adjustment valve 77. Full closing of the flow adjustment valve 77 stops water coming into each water heater 41, 42, 43 . . . . In the hot water supply system 2 (FIG. 1), a state of each of the connected plural water heaters 41, 42, 43 . . . switches between operating and stopping by the opening and closing of each of the flow adjustment valve 77. A first water heater 100 depicted in FIG. 3, which controls the operation of the hot water supply system 2 and stop thereof holds the flow adjustment valve 77 open during the hot water supply operation. Thereby, the first water heater 100 can grasp the hot water supplying state.

The bypass 78 is an example of a means for distributing the supplied tap water W etc. to the water heater 32 and the hot water outgoing pipe 13. The bypass 78 includes, for example, the bypass valve 90. The bypass valve 90 is an example of a means for, for example, controlling the flow rate of the tap water W, which is not heated, into the hot water outgoing pipe 13. The degree of the opening of the bypass value 90 may be controlled based on, for example, required supplied hot water temperature or the required supply of hot water.

The water supply pipe 6 in the hot water supply system 2 depicted in FIG. 1 is an example of a water supply means for letting the supplied tap water W and heated return water RW flow into the water heater 4. The water supply pipe 6 makes the supplied water branch so that the supplied water is introduced to the water supply side of each water heater 41, 42, 43 . . . , and connects the water heaters 41, 42, 43 . . . so that the water heaters 41, 42, 43 . . . are parallel with each other.

The communication line 10 is an example of a means for connecting the water heater 4 to each other communicably. For example, adjacent water heaters 4 are connected by a serial communication line, and communication is executed such as notification of an operation control command or stop control command etc., and notification of device information like hot water supply operation status information. In this hot water supply system 2, for example, the control device 81, 82, 83 . . . of each water heater 41, 42, 43 . . . is connected to each other by the communication line 10 to make all the water heaters communicable with each other, and the multi unit system is established. Thus, control information etc. from a water heater that is set for the priority device is transmitted to the water heaters 41, 42, 43 . . . .

Transmitting and receiving the operation control command and stop control command, information on a water heater, etc. are not limited to using the communication line 10 by wired connection. For example, short range wireless communication can be used therefor.

The hot water supply load 11 is disposed, for example, downstream of the hot water supply pipe 12, is constituted of a shower and/or a hot water outlet that supply heated hot water, and/or a heat sink means such as a heater using hot water, and requests the hot water supply of predetermined temperature and the predetermined flow rate from the hot water supply system 2.

The hot water supply pipe 12 is an example of a hot water supply means for introducing the hot water HW, which goes out from each water heater 41, 42, 43 . . . , to the hot water supply load 11. The hot water outgoing pipe 13 of the water heater 4 is connected to the hot water supply pipe 12 in parallel, and the hot water supply pipe 12 recovers the heated hot water HW. The hot water supply pipe 12 connects to the circulation line 14 downstream, and lets the hot water HW that passes through the hot water supply load 11 flow toward the water supply pipe 6.

The circulation line 14 is an example of a means for circulating the outgoing hot water HW around the water supply side and keeping the heat of the circulated hot water HW. For example, the circulation line 14 returns the hot water HW that is not used in the hot water supply load 11 and hot water, the heat of which is exchanged at the hot water supply load 11 etc. to the water supply pipe 6 as the return water RW. The return water RW returned to the water supply pipe 6 is mixed with the tap water W and is reheated in the water heater 4. The circulation line 14 joins a tap water pipe 92 which supplies the tap water W to be connected to the water supply pipe 6.

The circulation line 14 has, for example, the circulation pump 16, and also has the check valve 18 at a joint to the water supply pipe 6. The tap water pipe 92 has the check valve 20 at a joint to the tap water pipe 6.

The circulation pump 16 is an example of a means for pumping the return water RW in the circulation line 14 to the water supply pipe 6. Driving the circulation pump 16 allows the return water RW to flow to the water heater 4 via the water supply pipe 6 against water pressure of the supplied tap water W. The circulation pump 16 provides, for example, an electromagnetic switch. Thus, the circulation pump 16 can perform circulation operation while linked with the operation control of the hot water supply system 2 or stop control thereof in response to a control command from a water heater that is set for the priority device.

The check valve 18 is an example of a means for preventing the return water RW from flowing back from the water supply pipe 6 to the circulation line 14. The check valve 20 is an example of a means for preventing the tap water W from flowing back from the water supply pipe 6 to the tap water pipe 92. Since the circulation line 14, supply pipe 6 and tap water pipe 92 which all join let the check valves 18 and 20 prevent water from flowing back, the tap water W and the return water RW can be made to flow to the water supply pipe 6 with water pressure applied to the tap water W and water pressure by the circulation pump 16. That is, when water or the hot water HW is consumed by the use of a shower etc., water is supplied through the check valve 20. When the hot water supply load 11 such as a heater is used and water is not consumed, the circulation pump 16 is driven to make the return water RW flow to the water supply pipe 6 through the check valve 18. Thus, heat application at the predetermined temperature is maintained.

Figure 3:
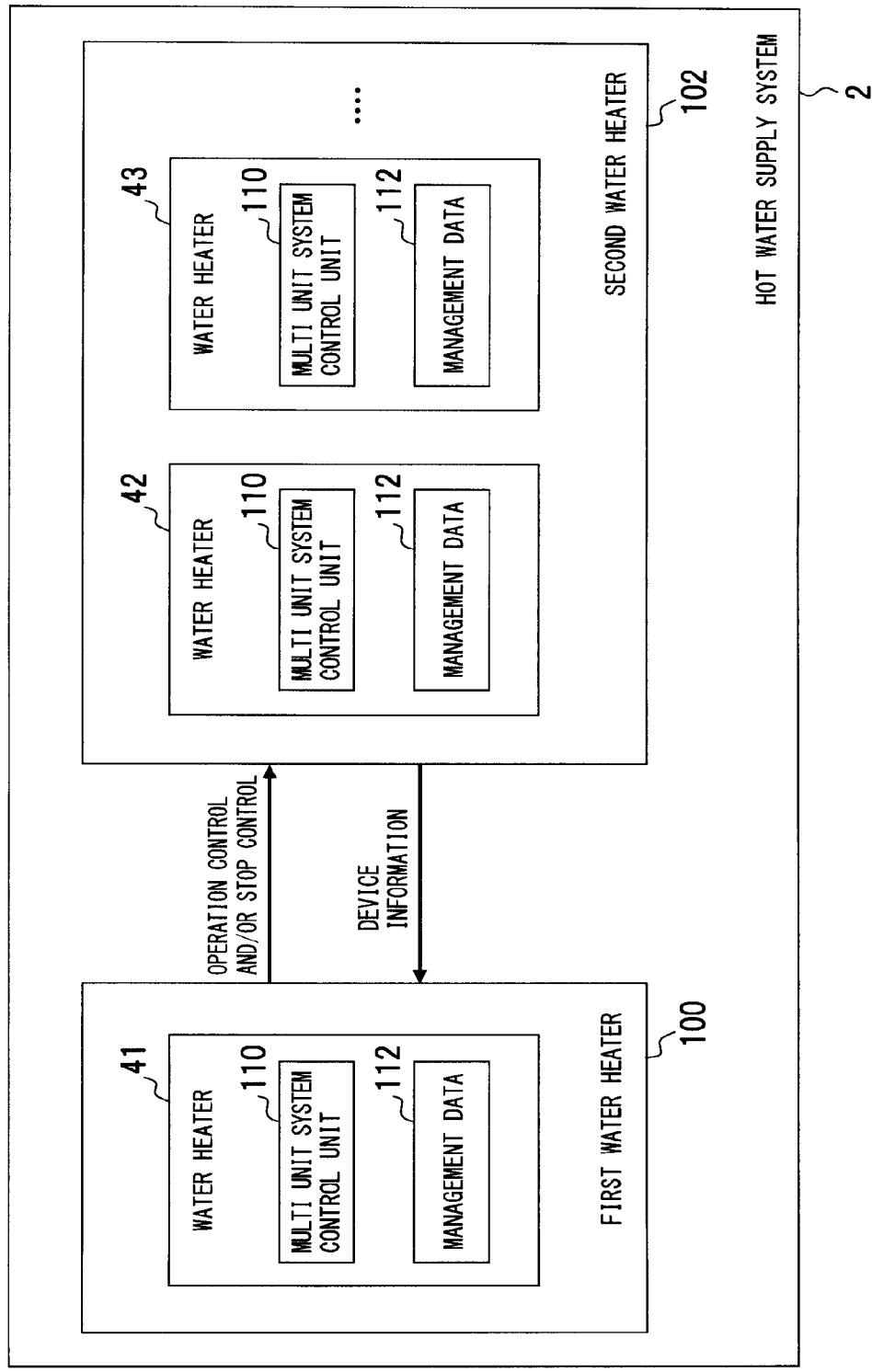
FIG. 3 depicts an example of functional structure of the hot water supply system.

An example of structure of the hot water supply system will be described with reference to FIGS. 3 and 4. FIG. 3 depicts an example of functional structure of the hot water supply system and FIG. 4 depicts an example of management data of the hot water supply system. Each structure depicted in FIGS. 3 and 4 is an example, and the present invention is not limited thereto.

In the hot water supply system 2 depicted in FIG. 3, one of operating water heaters 4 is set for the first water heater 100 as a control functional unit for linking each hot water supply operation of a plurality of the water heaters 4. The operation control command and/or stop control command outputted from the first water heater 100 is transmitted via the communication line 10 to other water heaters 4 that are set for second water heaters 102. In the hot water supply system 2 depicted in FIG. 3, for example, the water heater 41 is set for the first water heater 100 and the other water heaters 42, 43 . . . are set for the second water heater 102.

The first water heater 100 is an example of the priority device that controls the hot water supply operation of the hot water supply system 2, and a water heater 4, which is selected by a selection process or which is preset, is set for the first water heater 100. A priority device setting for the hot water supply system 2 is performed on the first water heater 100 in order to control the hot water supply control.

Each second water heater 102 is an example of the second water heater of the present disclosure. One or a plurality of the water heaters 42, 43 . . . is connected to the first water heater 100 in parallel. As described above, the water heaters 41, 42, 43 . . . are connected to each other via the communication line 10. Each second water heater 102 performs the hot water supply operation according to a control command from the first water heater 100. For example, a non-priority device (slave device) setting is performed on the second water heater 102 while the priority device setting is permitted on the first water heater 100.

Each water heater 41, 42, 43 . . . includes, for example, a multi unit system control unit 110 that executes the hot water supply operation, and the operation control and/or stop control, and management data 112.

The multi unit system control unit 110 is an example of a hot water supply operation management functional unit of the hot water supply system 2 and a control functional unit for controlling the operation or stop of each water heater 41, 42, 43 . . . . The multi unit system control unit 110 of the water heater 41 which is set for the first water heater 100 controls the hot water supply of the water heater 41, instructs operation control over whole of the hot water supply system 2, manages operation states of the other water heaters 4 (42, 43 . . . ), etc. The multi unit system control unit 110 of each water heater 42, 43 . . . that is set for the second water heater 102 performs the hot water supply operation according to a control command from the first water heater 100.

The management data 112 is an example of a means for storing the device information of the water heater 4 that is connected in the hot water supply system 2, such as setting information and operation state information. The first water heater 100 controls the operation of the hot water supply system 2 using the management data 112. For the management data 112, as depicted in FIG. 4, for example, device number information 114, priority device FLG information 116, operating FLG information 118, continuous operating time information 120, cumulative operating time information 122 and information on elapsed time after stop 124 are set.

The device number information 114 is an example of a number for identifying the water heater 4 connected in the hot water supply system 2. For example, the first water heater 100 that becomes the priority device identifies device numbers by an inquiry to each second water heater 102 when the hot water supply operation is started etc.

The priority device FLG information 116 is an example of information representing a water heater that is set for the first water heater 100, and is flag information for identifying the water heater 41 which is set for the priority device from the water heater 4 connected in the hot water supply system 2. In this management data 112, for example, "1" is set for priority device FLG of a water heater 4, which is set for the priority device, and "0" is set for a water heater that is not the priority device.

The operating FLG information 118 is an example of flag information for identifying whether the water heater 4 connected in the hot water supply system 2 is operating or not. In this management data 112, for example, "1" is set for a water heater 4, which is operating, and "0" is set for a water heater 4, which is stopping. For example, "other" is set for a water heater 4 in an anomaly state. The first water heater 100 may check the operating state of water heaters, for example, when a command of changing the setting information is received during the hot water supply operation or when the hot water supply operation is started.

The continuous operating time information 120 is an example of the operation state information of the water heater 4, and stores elapsed time since the last operation is started as to each operating water heater 41, 42, 43 . . . . For the continuous operating time, for example, operating time counted by a timer of the control device 81, 82, 83 . . . in each water heater 41, 42, 43 . . . may be used. The first water heater 100 controls, for example, the stop of each water heaters 42, 43 . . . based on this continuous operating time information 120.

The cumulative operating time information 122 is an example of the operation state information of the water heater 4, and for example, stores cumulative operating time since the operation is started as to each water heater 41, 42, 43 . . . . This cumulative operating time information 122 may be used for, for example, a criterion for the timing of exchanging the water heater 4 etc.

The information on elapsed time after stop 124 is an example of the operation state information of the water heater 4, and stores elapsed time since the hot water supply operation is suspended based on the above described continuous operating time, or is stopped. For example, when the required supply of hot water is increased etc., the first water heater 100 may select a water heater, about which a predetermined time has passed since the stop of its hot water supply, to make the selected water heater resume the operation with reference to the information on elapsed time after stop 124.

Regularly, or when the hot water supply operation is started or ended, the first water heater 100 may issue a request of checking an operation state to each second water heater 102, for example, and store information on each water heater 41, 42, 43 . . . in the management data 112. For example, when the first water heater 100 is changed, this management data 112 is taken over to a water heater that is newly set for the first water heater 100. The management data 112 may be stored in all the water heaters 4 connected in the hot water supply system 2.

In the hot water supply system 2 depicted in FIG. 3, for example, operation driving control information and/or stop driving control information are outputted from the first water heater 100 to each second water heater 102 in response to the hot water supply request from the hot water supply load 11, and device information is notified from each second water heater 102 to the first water heater 100. For example, in the device number information 114 in the management data 112 in FIG. 4, device numbers of the connected water heaters, 1 to 3 are set. In the priority device FLG information 116, "1" is set in only one part since the priority device is one. Since this priority device is during operation, "1" is set in the operating FLG information 118.

These water heaters 41, 42, 43 . . . are not limited to performing the hot water supply operation while one of the water heaters links to others as the hot water supply system 2. Each water heater 41, 42, 43 . . . can perform the hot water supply operation individually. It is also no need for the hot water supply operation by the hot water supply system 2 that all the water heaters 41, 42, 43 . . . start or stop each operation simultaneously. For example, the number of operating water heaters may be controlled according to the required flow rate from a destination of the hot water supply. A part of water heaters may be stopped according to continuous operating time of each water heaters 41, 42, 43 . . .

According to the above structure, a part of the water heaters which are connected in the hot water supply system is set for the priority device, and the hot water supply operation is performed by other water heaters linked to the priority device; thus, simplification of the control device can be achieved. The priority device grasps the operation state of the other water heaters to control the hot water supply; thus, the operation of the hot water supply system can be efficiently controlled. The hot water supply operation state of whole of the hot water supply system is grasped based on the flow rate information or temperature information detected by the priority device; thus, simplification of the hot water supply system can be achieved. A water flow to the priority device is stopped only when the hot water supply operation is stopped; thus, the priority device can grasp outgoing hot water from water heaters continuously and safety can be enhanced.

Second Embodiment

Figure 5:
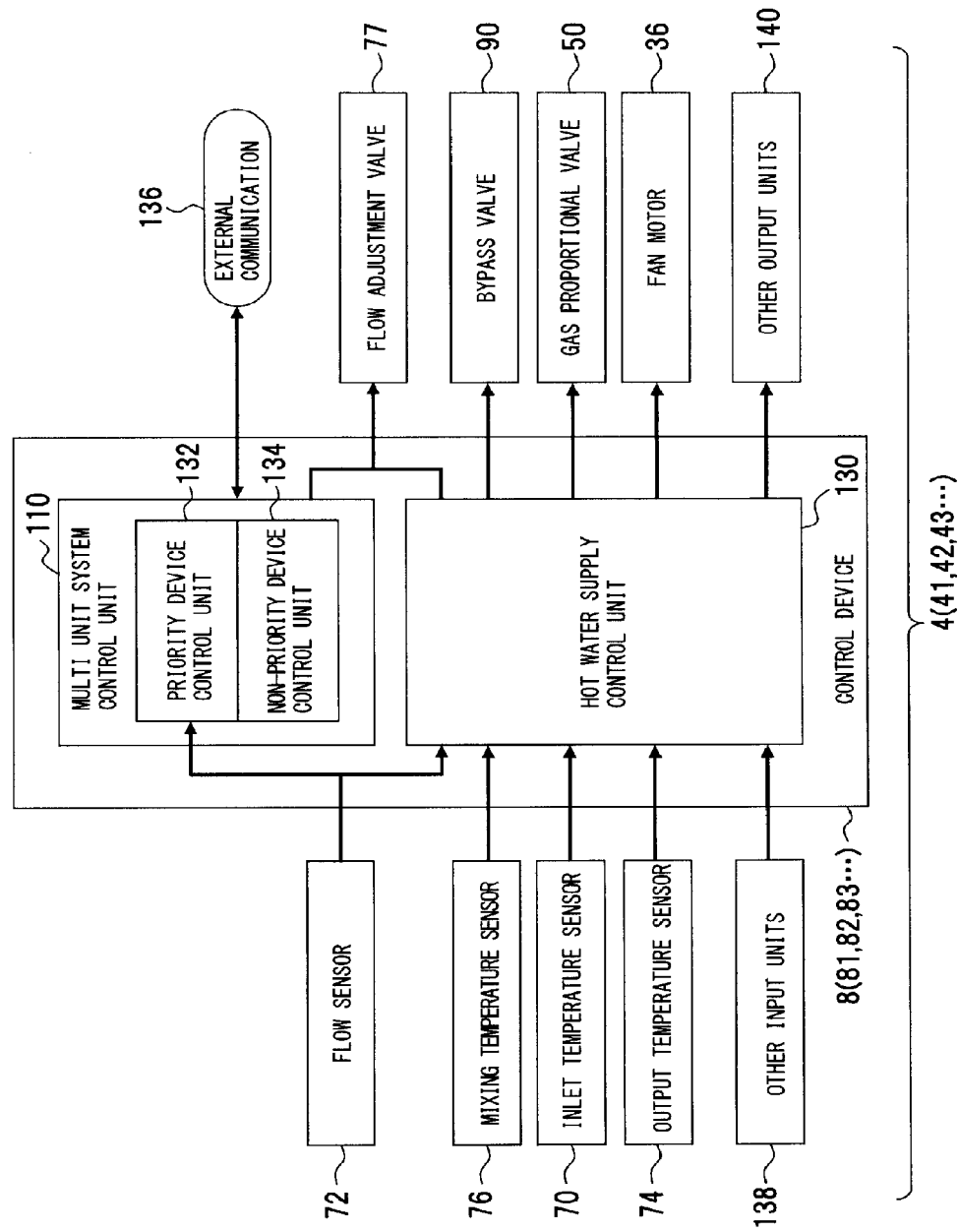
FIG. 5 depicts an example of structure of control function units in a water heater according to a second embodiment.
Figure 6:
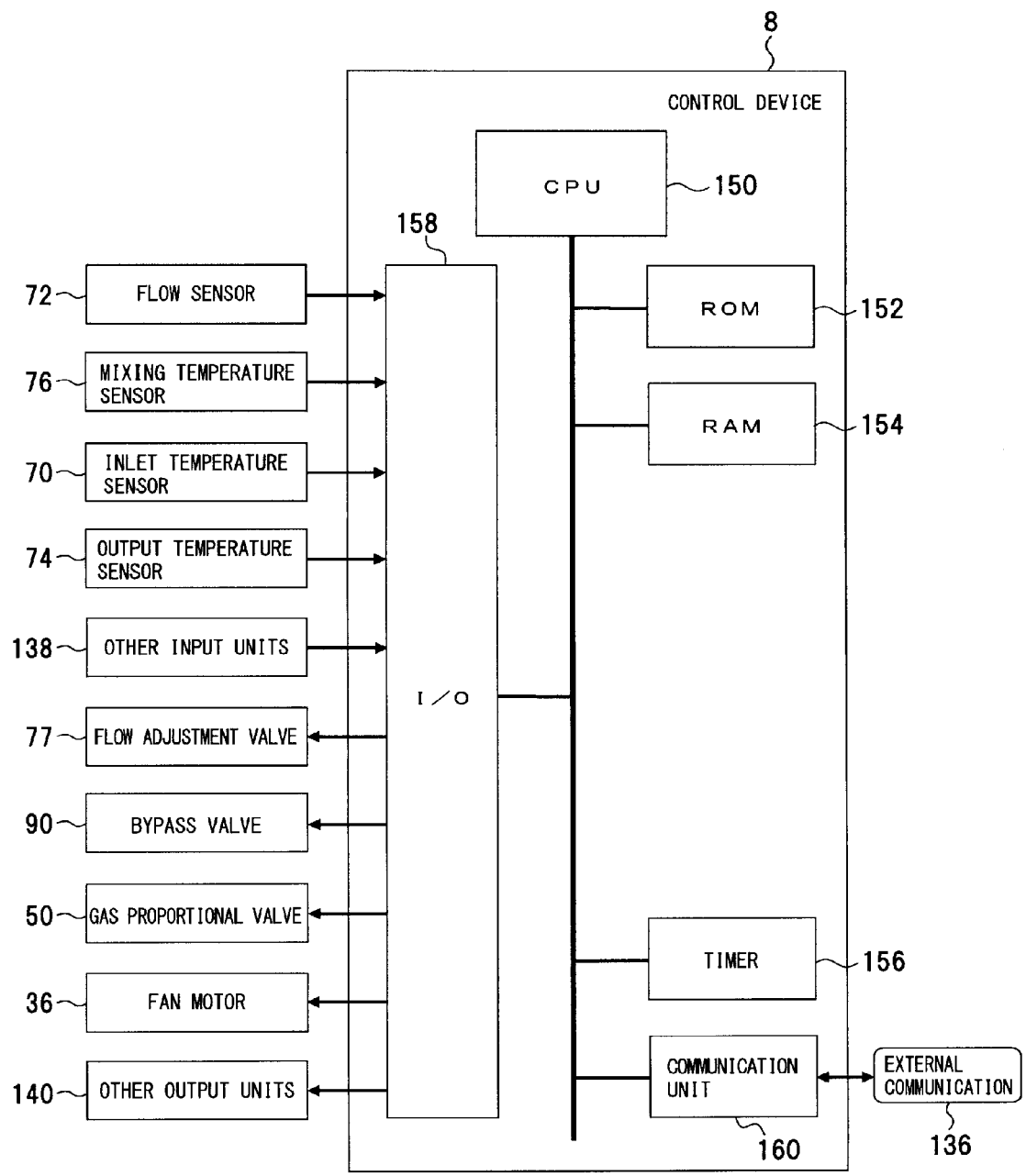
FIG. 6 depicts an example of structure of hardware of a control device.

A second embodiment will be described with reference to FIGS. 5 and 6. FIG. 5 depicts an example of structure of control function units in a water heater according to the second embodiment, and FIG. 6 depicts an example of structure of hardware of a control device. Each structure depicted in FIGS. 5 and 6 is an example, and the present invention is not limited thereto.

This water heater 4 (41, 42, 43 . . . ) is an example of the water heater that constitutes the hot water supply system of the present disclosure. For example, one water heater 4 is set for the priority device (first water heater 100) and other water heaters are set for slave devices (second water heater 102). The water heater 4 includes, for example, the control device 8 (81, 82, 83 . . . ) depicted in FIG. 1.

This control device 8 may include, for example, a multi unit system control unit 110 for making the hot water supply system 2 (FIG. 1) have a multi unit system and a hot water supply control unit 130 for performing the hot water supply operation. The control device 8 receives detection information from sensors disposed in the water heater 4, and outputs an operation control command based on this detection information.

The multi unit system control unit 110 is, as described above, an example of the management functional unit and control functional unit of the water heater 4, and for example, includes a priority device control unit 132 and a non-priority device control unit 134. The multi unit system control unit 110 provides, for example, an interface for connecting to the multiunit system control units 110 in other water heaters via an external communication 136 using the communication line 10, radio communication, etc. Thus, it is possible for the water heaters 41, 42, 43 . . . to perform two-way communication with each other. The multiunit system control unit 110 outputs an open command and/or close command to the flow adjustment valve 77 by, for example, the operation control based on the hot water supply request.

The priority device control unit 132 is a functional unit that functions in a water heater set for the first water heater 100 as the priority device, and that controls other water heaters 4 that are linked to the first water heater 100. The priority device control unit 132 outputs the operation command and/or stop command based on the management data 112, a command of increasing the number of operating water heaters and/or of decreasing the number thereof, etc. to the other water heaters 4 connected in the hot water supply system 2. When the operation is stopped because, for example, the water heater that is set for the first water heater 100 is in the anomaly state, the priority device control unit 132 executes a process such as selecting another water heater and setting the selected water heater for the first water heater 100.

Flow rate detection information is taken into the priority device control unit 132 from the flow sensor 72, for example. Thereby, in the first water heater 100, flow information of the water heater 4 which is connected in the hot water supply system 2 can be estimated based on information on the flow, which is supplied to the first water heater 100 itself. Thus, the number of operating water heaters 4 may be increased or decreased based on this flow information.

The non-priority device control unit 134 is an example of a functional unit for controlling the second water heaters 102 that are not the priority device, and for example, receives a control command from the first water heater 100 to perform the hot water supply operation. The non-priority device control unit 134 includes a function of notifying the operation state information of the second water heaters 102 etc. according to a request from the first water heater 100.

The hot water supply control unit 130 is an example of a control function for performing the hot water supply operation, and for example, makes the predetermined supply of hot water that is heated at setting temperature possible.

To the hot water supply control unit 130, for example, detection information from the flow sensor 72, mixing temperature sensor 76, inlet temperature sensor 70, output temperature sensor 74, other input units 138, etc. is inputted to be used for the hot water supply control. Control information generated based on the inputted information is outputted to, for example, the flow adjustment valve 77, bypass valve 90, gas proportional valve 50, fan motor 36 and other output units 140.

As an example of such control functions, the control device 8 depicted in FIG. 6 is constituted of, for example, an input circuit for receiving various signals, a microcomputer for executing various operations, a storage unit for storing a control program, data for operations, etc., a timer means, an output circuit for outputting various signals, etc. The control device 8 includes, for example, a CPU (Central Processing Unit) 150, a ROM (Read-Only Memory) 152, a RAM (Random-Access Memory) 154, a timer 156, an I/O (Input/Output) 158, a communication unit 160, etc.

The CPU 150 is an example of an operation means, and for example, executes an operation process of a hot water supply control program stored in the ROM 152 to output the hot water supply operation control command based on temperature detected by the inlet temperature sensor 70, output temperature sensor 74 and mixing temperature sensor 76, the flow rate detected by the flow sensor 72, etc. The CPU 150 also executes an operation control process and stop control process of the hot water supply system 2 in the water heater that is set for the priority device.

The ROM 152 is an example of a storage means, and for example, stores the program for the hot water supply control in the water heater 4, a control command program for the fan motor 36 and gas proportional valve 50, etc. The ROM 152 also stores, for example, a control program for performing priority device control such as, for example, circulation control of the circulation pump 16 or the hot water supply control of whole of the water heater 100, and a control program for linking the non-priority devices to the priority device as non-priority device control. Further, the ROM 152 includes programs for executing, for example, a process of changing the number of operating water heaters 4 based on the detected flow information etc., managing operating time of the water heater 4, executing a process of changing the priority device to another water heater, etc.

The ROM 152 which stores these control programs may be constituted of, for example, EEPROM (Electrically Erasable and Programmable Read Only Memory) that is rewritable electrically.

These control programs etc. are not limited to forms of being stored in the ROM 152. For example, forms of being stored in a computer-readable recording medium such as a magnetic disk, a flexible disk, an optical disk and a magneto-optical disc may be used.

The RAM 154 constitutes a work area for executing the above control programs etc.

The timer 156 is an example of the timer means, and for example, obtains time information such as continuous operating time, cumulative operating time and hibernation time of the water heater 4.

The I/O 158 is an example of an interface that takes in information detected by sensors etc. disposed in the water heater 4, or that outputs an opening degree command to valves. For example, the flow information from the flow sensor 72 and the temperature information from the mixing temperature sensor 76, inlet temperature sensor 70 and output temperature sensor 74 are taken into the water heater 4. The hot water supplying state of the hot water supply system is monitored etc. by using the taken information. Based on the hot water supplying state, for example, opening degree control information of the flow adjustment valve 77, bypass valve 90, gas proportional valve 50, etc., rotation speed control information for the fan motor 36, etc. are outputted. Input from the other input units 138 and output from the other output units 140 are also executed through the I/O 158.

The communication unit 160 is an example of a control unit that executes communication with the other water heaters 4 in the hot water supply system 2. As described above, the communication unit 160 cooperates with the communication unit 160 of the other water heater 4 via the external communication 136.

Figure 7:
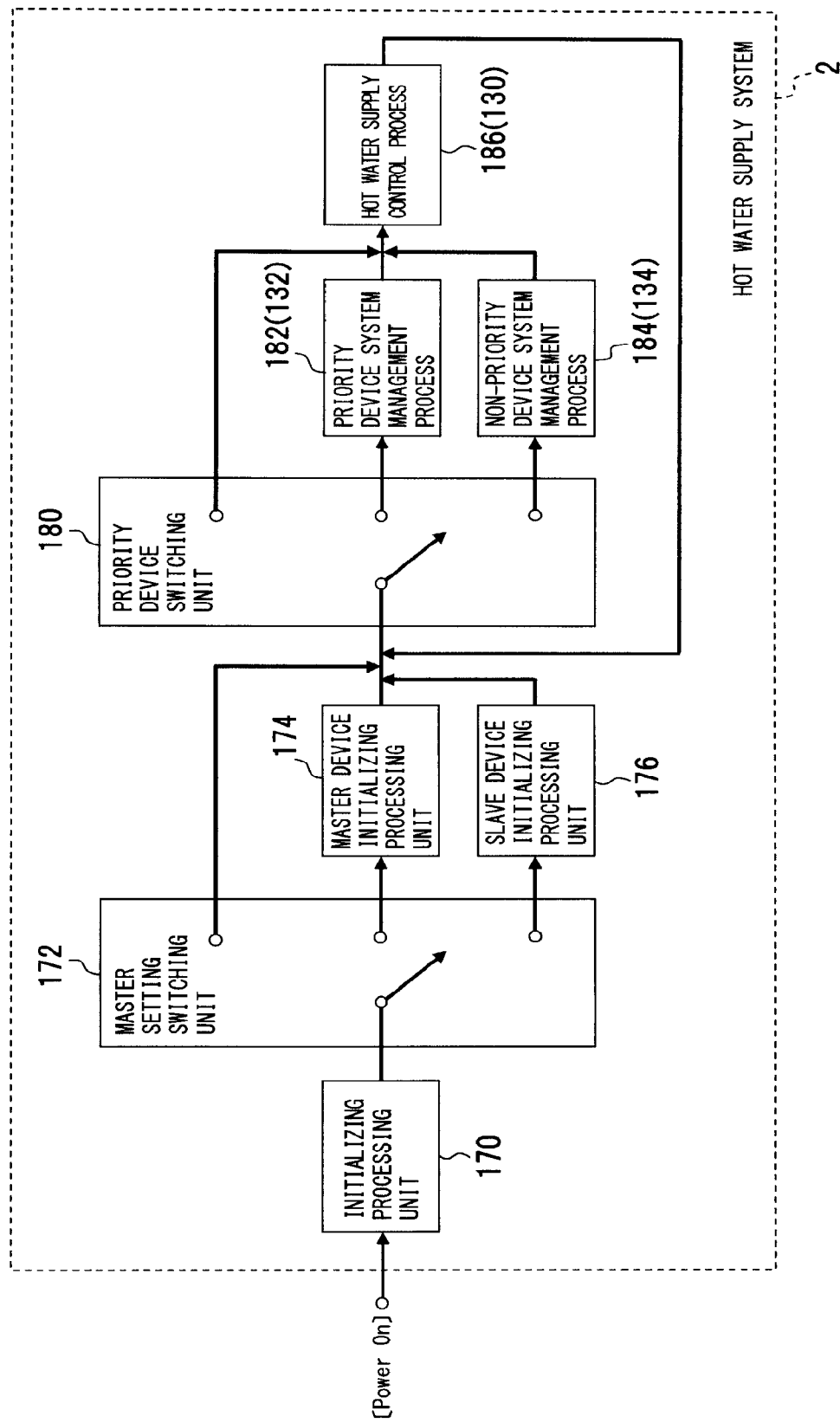
FIG. 7 is a block diagram depicting an example of a control process of a hot water supply system.

A control process of the hot water supply system will be described with reference to FIG. 7. FIG. 7 is a block diagram depicting an example of the control process of the hot water supply system. Structure depicted in FIG. 7 is an example, and the present invention is not limited thereto.

This hot water supply system 2 is an example of the hot water supply system and the water heater of the present disclosure. In the hot water supply system 2, one water heater that is set from a plurality of the water heaters 4 is defined as the priority device, and the other water heaters are linked to the priority device. In the hot water supply system 2 depicted in FIG. 7, the following processes are illustrated: an initial setting process for each water heater 4 and process of setting one water heater as the priority device after a power source is turned on; and a hot water supply control process executed while each water heater 4 being linked. For example, an initializing processing unit 170, a master setting switching unit 172, a master device initializing processing unit 174 and a slave device initializing processing unit 176 are included as an initial setting processing function of the water heater 4. For example, a priority device switching unit 180, a priority device system management process 182, a non-priority device system management process 184 and a hot water supply control process 186 are also included as the priority device setting process.

The initializing processing unit 170 is an example of an initial setting functional unit of the water heaters 4 that are connected in the hot water supply system 2. When a power source is turned on, the initializing processing unit 170 executes setting of the initial value that is stored in the ROM 152 in each water heater 4 etc.

The master setting switching unit 172 is an example of a function unit that determines whether master setting or slave setting is carried out on each water heater 4, or one water heater 4 solely operates to execute switching. In the case of the water heater 4 on which the master setting is carried out, the master device initializing processing unit 174 is selected and executed. In the case of the water heater 4 on which the master setting is not carried out, the slave device initializing processing unit 176 is selected and executed. If the water heater 4 is not used as the multi unit system and is made to operate solely, no setting process is carried out and this process moves to a process of the priority device switching unit 180.

The master device initializing processing unit 174 is an example of a processing unit that sets the water heater 4, on which the master setting was carried out in advance, for the priority device in the start of the hot water supply operation when the hot water supply system 2 is activated. This master setting is carried out on the control device 8 of the water heater 4 by, for example, a dipswitch etc. For example, "1" is set in the priority device FLG information 118 in the management data 112 as to the water heater on which the master setting is carried out.

The slave device initializing processing unit 176 is a processing unit that identifies a water heater 4, on which the master setting is not carried out, and gives the identified water heater 4 a device number when the hot water supply system 2 is activated. Since a device number of a water heater 4 other than the master is not identified, a temporary number is set for every water heater other than the master. The number, which is set, is stored in the device number information 114 in the management data 112.

The priority device switching unit 180 is an example of a processing unit that identifies whether to be the water heater which is set for the priority device, and performs switching. In the case of the water heater 4 set for the priority device, this process moves to the priority device system management process 182. In the case of a water heater that is not set for the priority device, this process moves to the non-priority device system management process 184. When a water heater is solely operated, nothing is selected and this process moves to the hot water supply control process 186.

The priority device system management process 182 is an example of a process of controlling the hot water supply system 2 by the water heater 4 which is set for the priority device. For example, a process of transmitting or receiving a temporary number or a fixed number to or from a water heater 4, which is set for a slave, a number check process, etc. are executed. This temporary number and fixed number represent device information, and the temporary number is a number which is temporary for a water heater and the fixed number is a number which is fixed for a water heater. Management of the operation states of connected water heaters, a process of changing the number of operating water heaters according to the hot water supply request, etc. are also executed.

The non-priority device system management process 184 is an example of a device management process executed by a water heater 4 other than the priority device. For example, the open control of the flow adjustment valve 77 and close control thereof according to an operation command from the priority device, a process of changing the priority device, an anomaly occurrence monitoring process, etc. are executed.

The hot water supply control process 186 is an example of the hot water supply operation control in the water heater 4. For example, the open control of the flow adjustment valve 77 and close control thereof, detection of the flow information, monitoring the temperature information, combustion control, etc. are executed according to a hot water supply operation start command.

Figure 8:
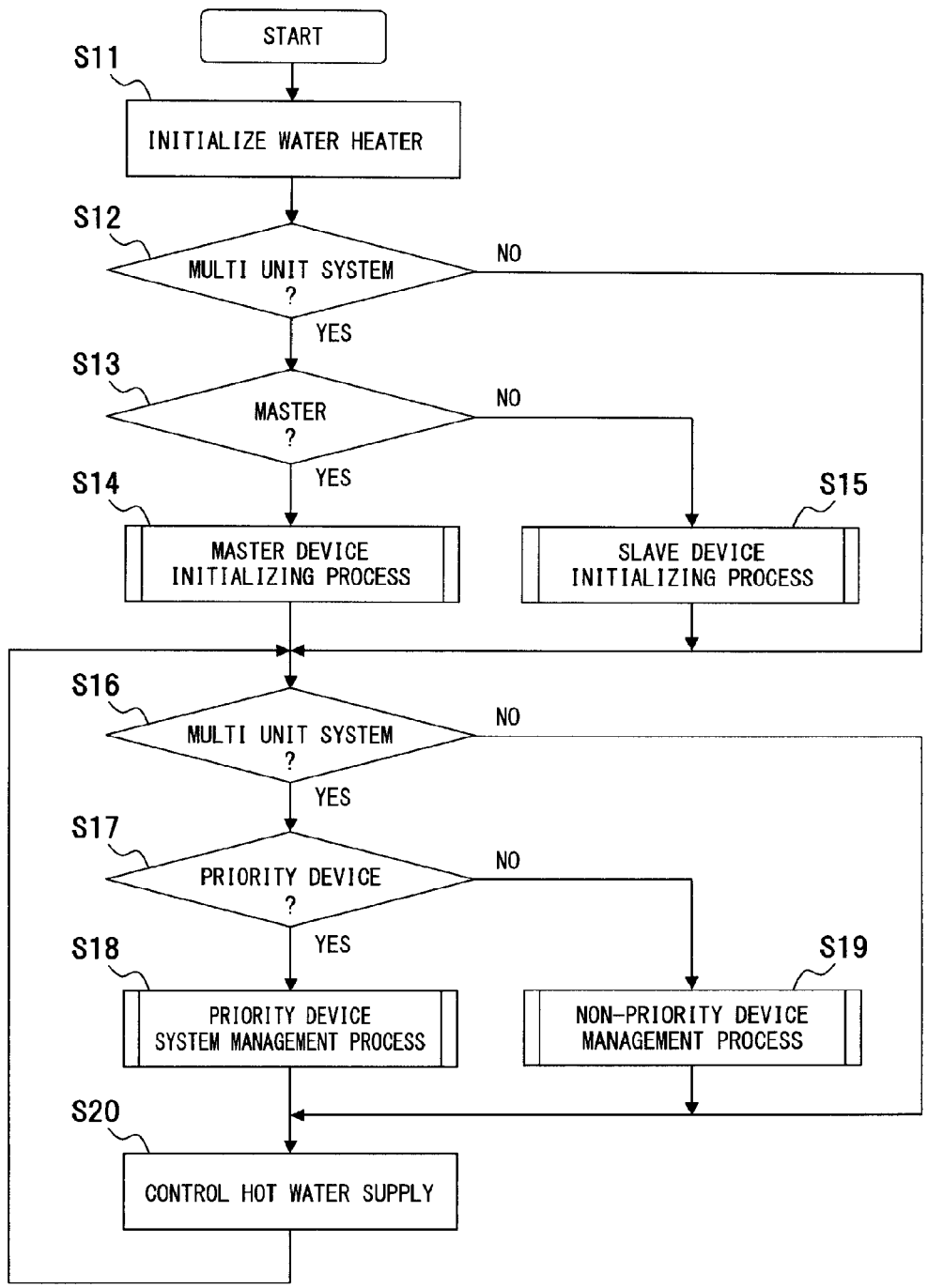
FIG. 8 is a flowchart depicting an example of a hot water supply control process.
Figure 9:
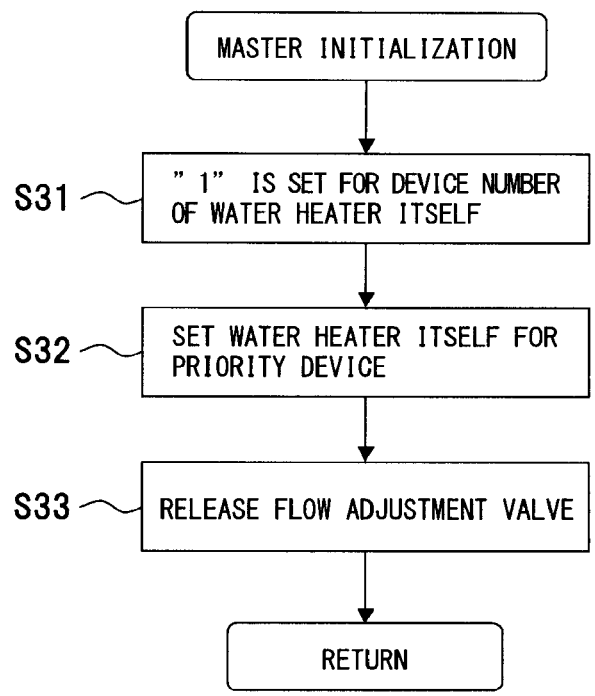
FIG. 9 is a flowchart depicting an example of a master initialization process.
Figure 10:
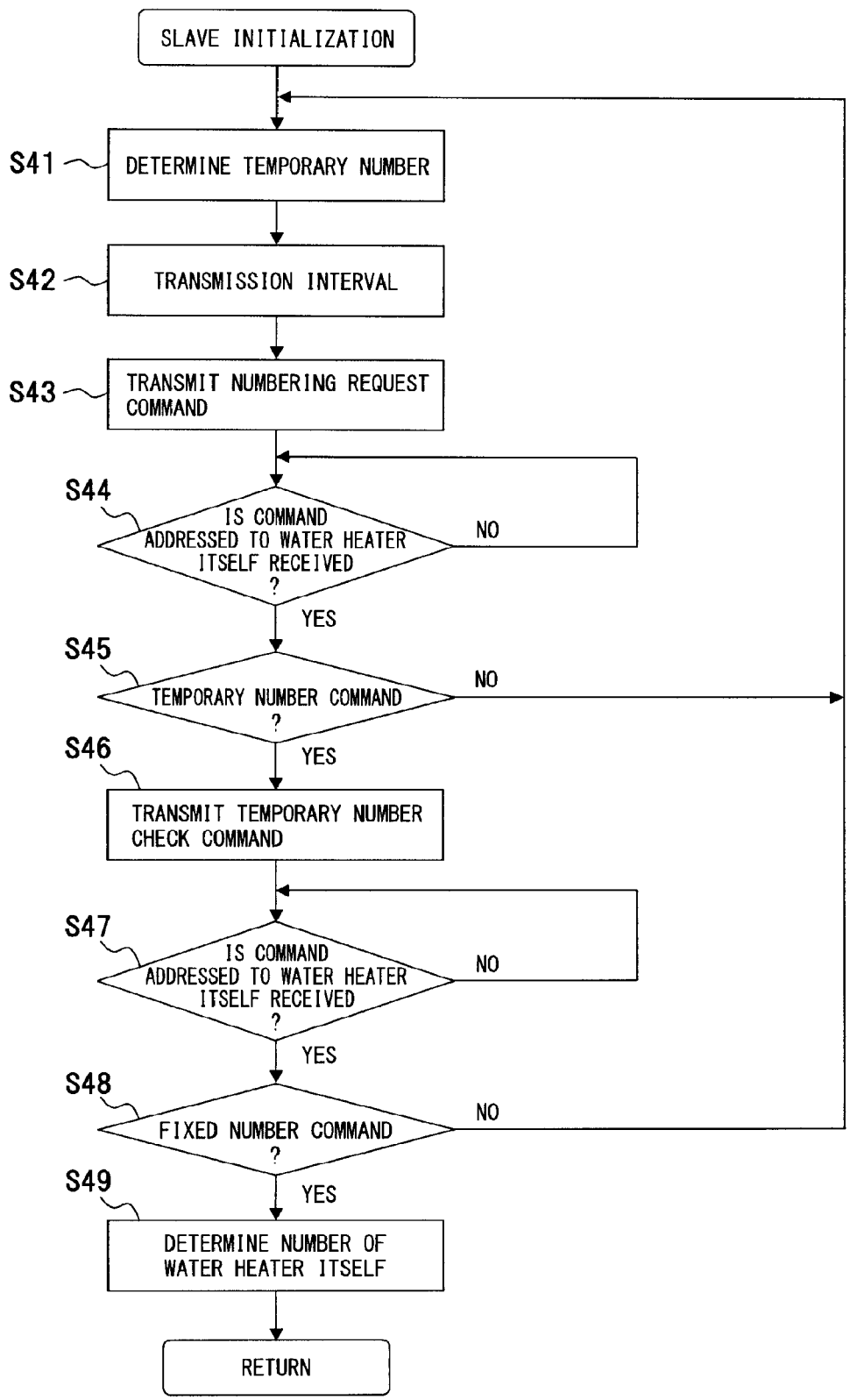
FIG. 10 is a flowchart depicting an example of a slave initialization process.
Figure 11:
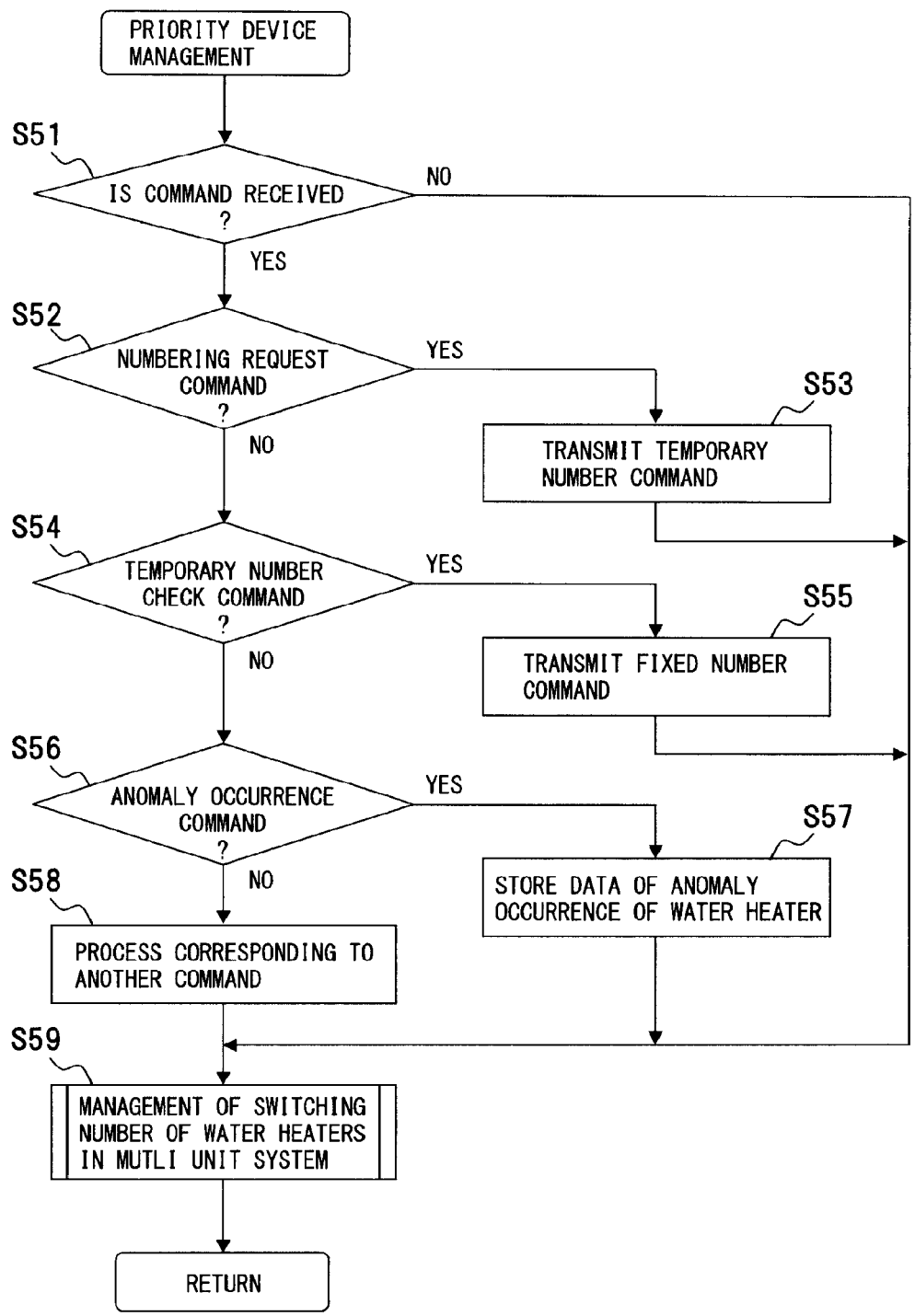
FIG. 11 is a flowchart depicting an example of a priority device management process.
Figure 12:
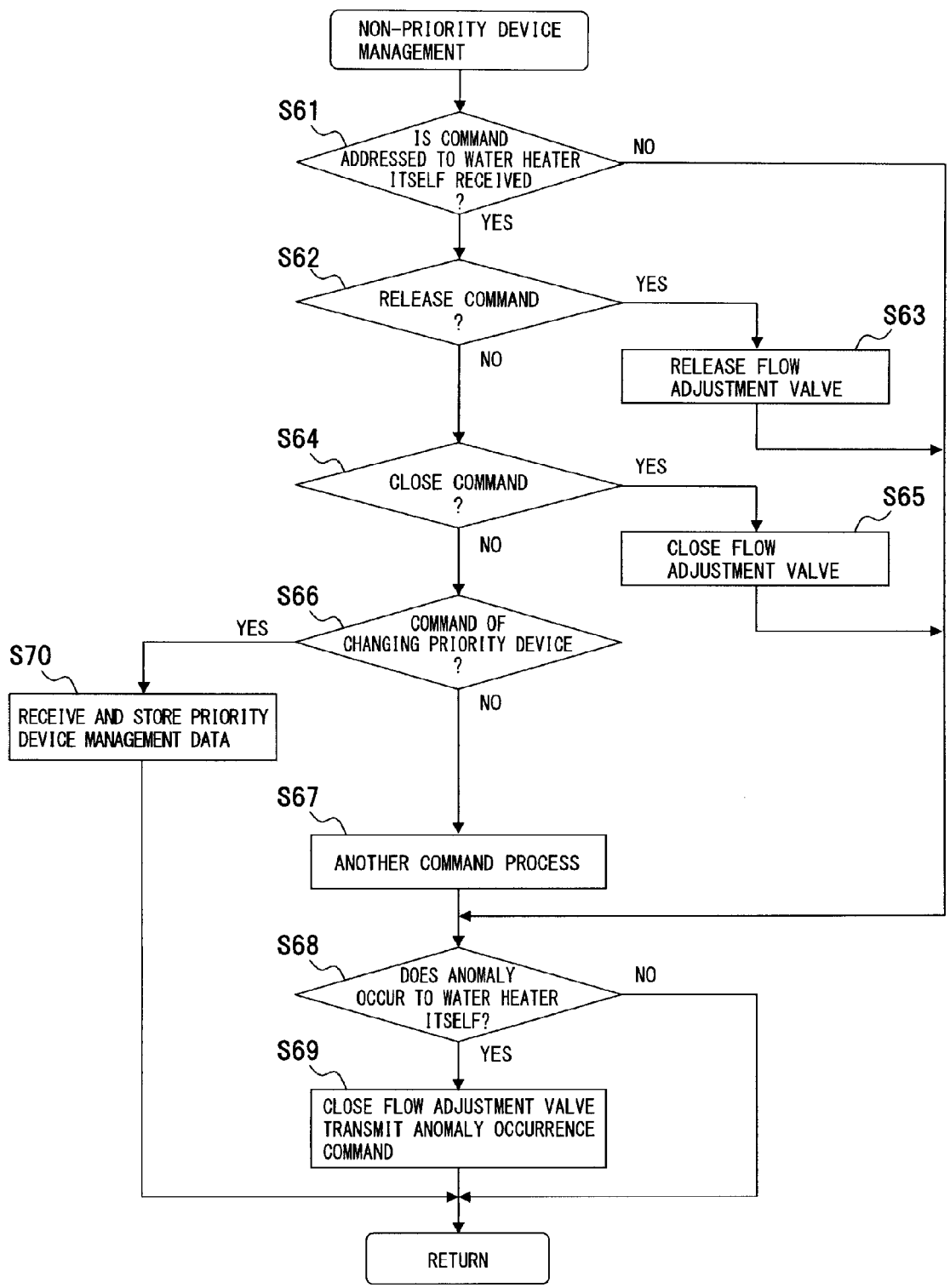
FIG. 12 is a flowchart depicting an example of a non-priority device management process.

A control process in the hot water supply system will be described with reference to FIGS. 8, 9, 10, 11 and 12. FIG. 8 is a flowchart depicting an example of the hot water supply control process, FIG. 9 is a flowchart depicting an example of a master initialization process, FIG. 10 is a flowchart depicting an example of a slave initialization process, FIG. 11 is a flowchart depicting an example of a priority device management process, and FIG. 12 is a flowchart depicting an example of a non-priority device management process. Each processing procedure and processing content depicted in FIGS. 8 to 12 is an example, and the present invention is not limited thereto.

This control process of the hot water supply system is an example of the hot water supply control method or hot water supply control program of the present disclosure. When the multi unit system is constituted, a certain water heater is set for the priority device and device information of each of the other water heaters is identified. Control such as the hot water supply operation control of the hot water supply system, monitoring a state of each water heater and switching of the number of operating water heaters is performed by a water heater designated as the priority device.

When a power source is turned on, initializing is executed such as initialization of the I/O and setting of the initial values of various settings by the initial setting (step S11). When water heaters are set for the operation in the multi unit system (YES of step S12), it is determined for each water heater whether to be a water heater that is set for the master or not (step S13). For example, if the master setting is carried out on a control board (PCB), which is the control device 8, of a water heater by the dipswitch etc. (YES of step S13), initialization as the master device is executed (step S14). In a case of a water heater other than the master (NO of step S13), initialization of the slave device is executed (step S15).

After these initialization setting processes are ended, the hot water supply operation is started. A control process in this hot water supply operation is repeatedly executed during the hot water supply operation.

If the hot water supply system 2 is the multi unit system (YES of step S16), an operating water heater 4 determines whether to be the priority device or not by itself (step S17). In a case of a water heater that is set for the priority device (YES of step S17), the priority device system management process is executed (step S18), and a management process is executed as the control device of the multi unit system. In a case of a water heater that is not set for the priority device (NO of step S17), the water heater is linked to the priority device according to command information from the priority device as the non-priority device management process (step S19).

After the above setting process is executed, a process of heating supplied water is executed, for example, in response to a water flow to the water supply pipe 6, and this process moves to the hot water supply control of supplying hot water at the predetermined temperature (step S20).

The initialization processes of the water heaters which are executed in this control process of the hot water supply system will be described.

[Master Initialization Process]

The master initialization process depicted in FIG. 9 is an example of the master device initialization process (step S14). For example, when the master setting is carried out on a water heater by the dipswitch on the control board which constitutes the control device 8 etc., "1" is set for the device number of this water heater itself (step S31). This device number which is set here is stored in the management data 112 in the ROM 152 or the like.

Since the master setting is carried out on this water heater 4 as described above, the water heater 4 is set for the priority device as the first water heater 100 when the hot water supply system 2 is activated, and the priority device information thereof is stored in the management data 112 (step S32). After the setting of the priority device is executed, the flow adjustment valve 77 of the water heater 4 is made to be a released state (step S33), and the master initialization process is ended. The first water heater 100 that manages the hot water supply of the hot water supply system 2 keeps the flow adjustment valve 77 the released state. Thus, hot water supply that the first water heater 100 does not grasp can be prevented.

[Slave Initialization Process]

The slave initialization process depicted in FIG. 10 is an example of the slave device initialization process (step S15). In this initialization of a slave, the device number for identifying each water heater 4 that constitutes the second water heaters 200 is determined. For managing the multi unit system in the hot water supply system 2, it is necessary to identify a connected water heater 4. As to this water heater 4, for example, the master setting is carried out on one of the water heaters and device numbers are not set for the other water heaters in order to simplify the work in installation. Thus, in the hot water supply system 2, for example, when the hot water supply system 2 is activated, a process of setting device numbers is executed on the second water heaters 102 (water heater 4 that is set for the slave) for which the device numbers etc. are not set.

In the slave initialization process, a temporary number of each water heater is set by a water heater itself (step S41). This temporary number may be determined based on random numbers generated using, for example, a stack pointer value and free run timer value of the CPU 150 that is equipped with each control device 8, past combustion time, etc. in order not to be the same as the other water heaters.

When the temporary number is set, an interval before the temporary number is notified to the first water heater 100 that is the priority device is set (step S42). The first water heater 100 can identify each water heater connected in the hot water supply system 2 by the temporary number notified from each water heater. After all the water heaters are identified, the first water heater 100 gives each water heater a fixed number. The interval before the notification to the first water heater 100 is, for example, a time lag calculated based on the temporary number in order that communication is not crossed even if the other water heaters are activated concurrently.

After the interval has passed, the water heater 4 transmits a "numbering request command" including the temporary number to the first water heater 100 (step S43).

The process is on standby until a command addressed to the water heater itself is received from the first water heater 100 (step S44). The reception of the command is checked based on, for example, the included temporary number. When the command addressed to the water heater itself is received (YES of step S44), the command is determined whether to be "temporary number command" (step S45). In the case of "temporary number command" (YES of step S45), "temporary number check command" is transmitted to the first water heater 100 (step S46).

After "temporary number check command" is transmitted, the process is in the standby state until the command addressed to the water heater itself is received from the first water heater 100 (step S47). For example, the included temporary number may be used for the command reception from the first water heater 100.

When the command addressed to the water heater itself is received (YES of step S47), the command is determined whether to be "fixed number command" (step S48). In the case of "fixed number command", a number of the water heater itself is determined from received contents. Then, the fixed number is stored in the storage unit of the water heater 4 (step S49).

[Priority Device Management Process]

The priority device system management process of the first water heater 100 that is set for the priority device will be described. The priority device management process depicted in FIG. 11 is an example of the hot water supply control method or hot water supply control program of the present disclosure, and depicts the priority device system management process (step S18). This process is executed only by the priority device in the multi unit system. Since the priority device is changed according to a predetermined condition as described below, the priority device management process may be executed when setting change of the priority device is performed.

Command reception from each second water heater 102 is monitored (step S51). If a command for the first water heater 100 which is the priority device is received (YES of step S51), whether the received command is "numbering request command" or not is determined (step S52). If this command is "numbering request command" (YES of step S52), "temporary number command" is transmitted using the temporary number included in the received "numbering request command" (step S53).

If the received command is "temporary number check command" (YES of step S54), the first water heater 100 assigns an unused number in the numbers for the water heaters, which the first water heater 100 manages, to a water heater that issues the command. "Fixed number command" including the assigned number is transmitted using a temporary number included in the received "temporary number check command" (step S55).

The process of the above S51 to S55 is executed correspondingly to the number determination request explained in the above slave initialization process.

If the received command is "anomaly occurrence command" (YES of step S56), a water heater to which an anomaly occurs is identified by the device number included in the received "anomaly occurrence command". Thus, the anomaly occurrence is stored in the operation FLG information 118 in the management data 112 as to the identified water heater (step S57). If the received command is another command, a process corresponding to that command is executed (step S58).

These processes are continuously executed by the first water heater 100 which is the priority device. Therefore, even if there is a water heater, activation of which is delayed and which is activated during the operation of the multi unit system, the delayed water heater is given a device number and can be added to the system. Moreover, an anomaly occurrence state of the delayed water heater can be grasped.

In the operation in the multi unit system of the hot water supply system 2, management of switching the number of water heaters is also executed that is for managing switching the number of operating water heaters (step S59).

[Non-Priority Device Management Process]

The process executed by each water heater other than the priority device will be described. The non-priority device management process depicted in FIG. 12 is an example of the hot water supply control method or hot water supply control program of the present disclosure, and corresponds to the non-priority device management process in S19. This process is a process executed for a command issued from the first water heater 100 to each second water heater 102.

When the command addressed to a water heater itself is received (YES of step S61), the flow adjustment valve 77 is released and the water heater itself is in an operating state (step S63) if the command is a release command (YES of step S62). If the command is a close command (YES of step S64), the flow adjustment valve 77 thereof is closed and the water heater itself is in a stopped state (step S65).

If the command represents priority device change (YES of step S66), priority device management data received from the first water heater 100 is stored in the storage unit of the water heater itself (step S70). This water heater is set for the first water heater 100 by execution of, for example, the above priority device management process (FIG. 11)

Operation according to another received command is also executed (step S67). The anomaly occurrence state of the water heater itself is monitored (step S68), and if there is an anomaly (YES of step S68), the flow adjustment valve 77 is closed, and the anomaly occurrence command is transmitted to the first water heater 100 which is the priority device (step S69).

The above master device initialization process, slave device initialization process, priority device management process and non-priority device management process may be executed, for example, concurrently or repeatedly.

According to the above structure, a part of the water heaters which constitute the hot water supply system is set for the priority device, and the hot water supply operation is performed by other water heaters linked to the priority device; thus, simplification of the control device can be achieved. The number of operating water heaters is controlled according to information detected by the priority device; thus, the operation of the hot water supply system can be efficiently controlled. Since the management information of each water heater that is connected in the hot water supply system is also moved when the priority device is changed, continuous hot water supply operation can be performed. The priority device gives a device number to each water heater connected in the hot water supply system; thus, it is not necessary to provide a management device separately, and all water heaters can be managed identifiably.

Third Embodiment

Figure 13:
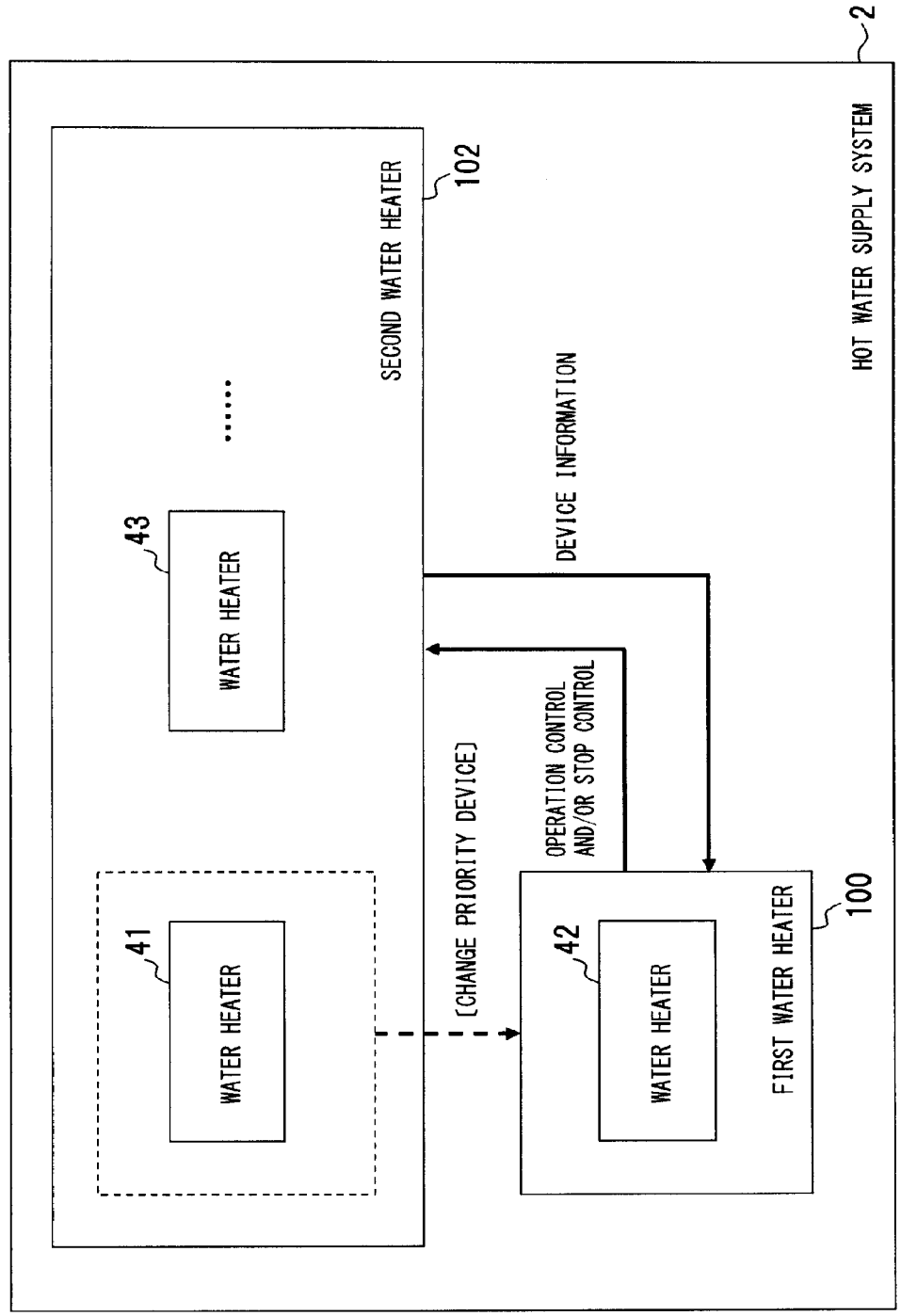
FIG. 13 depicts an example of a priority device changing process and a hot water supply control process according to a third embodiment.

A third embodiment will be described with reference to FIG. 13. FIG. 13 depicts an example of the priority device changing process and the hot water supply control process according to the third embodiment. Structure depicted in FIG. 13 is an example, and the present invention is not limited thereto.

This hot water supply system 2 depicted in FIG. 13 is an example of the hot water supply system or water heater of the present disclosure. The first water heater 100 that is the priority device is changed from the water heater 41 to the water heater 42, and the water heater 42 controls the hot water supply operation in the hot water supply system 2.

This priority device changing process is an example of the management of switching the number of the water heaters in the hot water supply system 2, and for example, is executed when the water heater 41 is in the anomaly state, when continuous operating time thereof excesses a predetermined time, etc. In the process of changing the priority device, for example, the management data 112 that identifies each water heater connected in the hot water supply system 2 is delivered from the water heater 41 that is the previous priority device to the water heater 42 that is the new priority device, or an updating process of the management data 112 is executed.

Like the above, the process of changing the priority device is executed in order to prevent stable hot water supply from being impossible due to concentration of loads on the water heater 41 that is set for the priority device. As described above, the priority device that is set when the hot water supply system 2 is turned on is determined by the master setting for one water heater that is pre-selected from a plurality of the connected water heaters. However, after the hot water supply system 2 is activated, the priority device is changed among the water heaters according to the predetermined condition.

In the process of changing the priority device depicted in FIG. 13, the operating water heater 42 is set for the new priority device. This embodiment is not limited thereto. For example, a water heater, which is being stopped and is not in the anomaly state, may be newly activated to be set for the priority device.

Figure 14:
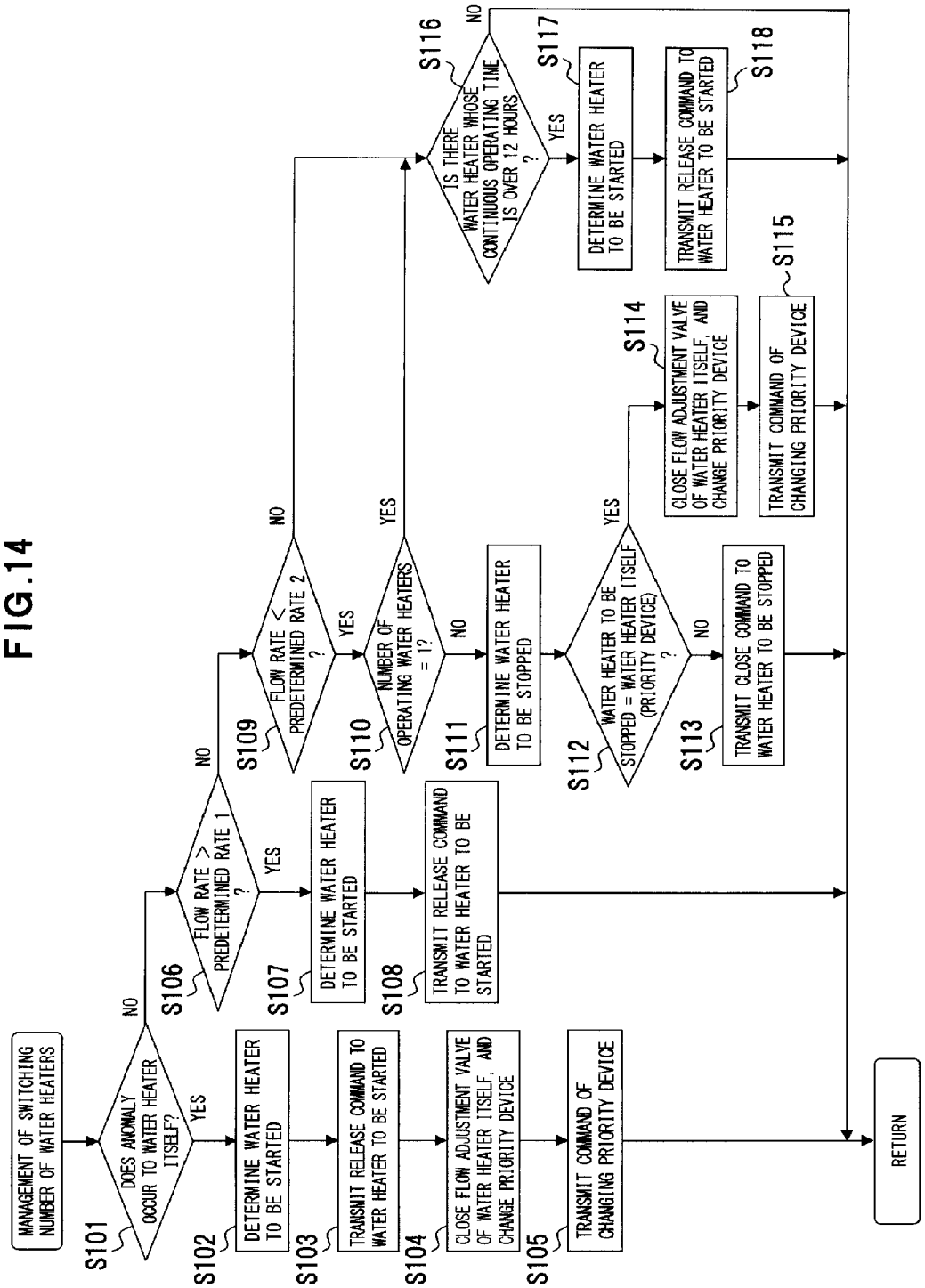
FIG. 14 is a flowchart depicting an example of a process of management of switching the number of operating water heaters.

The process of switching the number of operating water heaters in the hot water supply system 2, which includes this process of the management of switching the priority device will be described with reference to FIG. 14. FIG. 14 is a flowchart depicting an example of the process of the management of switching the number of operating water heaters. Processing procedure and processing content depicted in FIG. 14 are an example, and the present embodiment is not limited thereto.

This process of the management of switching the number of operating water heaters is an example of the hot water supply control method or hot water supply control program of the present disclosure. This process is one of main processes of the multi unit system management executed by the priority device, and includes the above process of changing the priority device. In the operation control of the hot water supply system 2 and stop control thereof, for example, whether to increase or decrease the number of operating water heaters is determined based on information on the water flow rate in the first water heater 100 that is the priority device. In the increase control of the water heaters and decrease control thereof, as described above, the flow adjustment valve 77 of the priority device is set in the released state. Thus, based on a detection result of the flow adjustment sensor 72, the number of the operating water heaters is increased or decreased. An operation start process or operation stop process is controlled based on operating time of each water heater.

The first water heater 100 that is the priority device determines whether an anomaly occurs thereto. If so (YES of step S101), a substitute water heater to be started is determined in order that the water heater itself is stopped (step S102). For the substitute water heater to be started, a water heater of predetermined elapsed time after the stop, for example, within 10 min is selected. Or, a water heater of the shortest cumulative operating time is selected from water heaters, which is being stopped, of no anomaly occurrence. Conditions of the water heaters may be determined using the information stored in the management data 112.

When a water heater to be operated is determined, "release command" of instructing the release of the flow adjustment valve 77 is transmitted to the determined water heater as an activation command (step S103). The flow adjustment valve 77 of the water heater itself is closed, the anomaly state of the water heater itself is stored to the management data 112, and the determined water heater is set for the priority device (step S104).

The new priority device may be selected from the operating water heaters. For example, a water heater of shorter continuous operating time or shorter cumulative operating time may be selected. When the new priority device is selected, the management data 112 and the command of changing the priority device are transmitted to the selected water heater (step S105).

If there is no anomaly in the water heater itself (NO of step S101), this process moves to monitoring the incoming water flow (step S106). When the flow rate detected by the flow sensor 72 is over a predetermined rate 1 (YES of step S106), the number of the operating water heaters is increased. This predetermined rate 1 is, for example, a threshold value of the incoming water rate that is set in each water heater. A case where the flow rate is over the predetermined rate 1 means that the number of the operating water heaters is small and a load for one water heater is heavy.

For the water heater to be newly started, a water heater of the shortest operating time in water heaters, which are stopped, of no anomaly occurrence or a water heater of predetermined elapsed time after stop, for example, within 10 min, may be selected (step S107). "Release command" of the flow adjustment valve 77 is transmitted to the determined water heater (step S108) to increase the number of the operating water heaters.

When the incoming water flow is smaller than the predetermined rate 1 (NO of step S106) and smaller than the predetermined rate 2 (YES of step S109), this process moves to control of decreasing the number of the operating water heaters. This predetermined rate 2 is, for example, a threshold value of smallest flow rate for each water heater. A case where the incoming water flow is under the predetermined rate 2 means that the number of the operating water heaters is too large or the hot water supply request is stopped.

When a plurality of the water heaters are currently operating (NO of step S110), the number of the operating water heaters are decreased (step S111). In this case, a water heater of longer continuous operating time is selected for a water heater to be stopped from the operating water heaters. Whether the selected water heater is the priority device or not is determined (step S112). In the case of not the priority device (NO of step S112), a close command of the flow adjustment valve 77 is transmitted to the selected water heater (step S113). If the selected water heater is the water heater itself which is the priority device (YES of step S112), the first water heater 100 closes the flow adjustment valve 77 thereof and the process of changing the priority device is executed (step S114).

A water heater that newly becomes the priority device is selected from the operating water heaters, and that is, for example, a water heater of shorter continuous operating time or a water heater of the shorter cumulative operating time may be selected. When the new priority device is determined, the management data 112 and the command of changing the priority device are transmitted to the determined water heater (step S115).

When an operating water heater is only the first water heater 100 that is the priority device (YES of step S110), the hot water supply operation is still continued when there is the hot water supply request since the number of water heaters is not decreased from one.

When there is no increase or decrease of the number of the operating water heaters, that is, there is the incoming water flow within a preset range for each operating water heaters (NO of step S106, NO of step S109), the monitoring of the incoming water flow is continued. Concurrently with this monitoring of the incoming water flow, continuous operating time of each water heater is monitored (step S116). When the flow rate is under the predetermined rate 2 (YES of step S109) and the number of the operating water heaters is only one (YES of step S110), continuous operating time is also monitored (step S116).

For example, when there is a water heater, continuous operating time of which reaches 12 hours (YES of step S116), a water heater which is newly started is determined in order to stop the water heater operating for 12 hours (step S117). The water heater to be started may be determined as well as the above described S102 and S107. The release command of the flow adjustment valve 77 is transmitted to the water heater to be started to increase the number of the operating water heaters (step S118). This process again moves to S116 and S109 that are flow rate monitoring processes.

The number of the operating water heaters is increased at S118 for the hot water supply system 2 that operates with a proper incoming water flow by the above process. Thus, the incoming water flow to each water heater which is currently operating becomes under the predetermined rate 2. Therefore, the incoming water flow becomes under the predetermined rate 2 in the flow rate monitoring process in the hot water supply system 2 of increasing the number of the operating water heaters (YES of step S109). In the determination process of the water heater to be stopped (step S111), a water heater, continuous operating time of which reaches 12 hours, is selected and can be stopped. When the incoming water flow is under the predetermined rate 2 (YES of step S109) and the number of the operating water heaters is 1 (YES of step S110), this process can also move to the determination of the water heater to be stopped (step S111) by increasing the number of the operating water heaters at S117 (NO of step S110).

According to the above structure, even if there is a water heater that is operating for a longtime continuously, the water heater can be exchanged without reducing the supply of hot water even just a moment or without stopping the hot water supply operation. A part of the water heaters which constitute the hot water supply system is set for the priority device, and the hot water supply operation is performed by the other water heaters linked to the priority device; thus, simplification of the control device can be achieved. The number of the operating water heaters is controlled according to the information detected by the priority device; thus, the operation of the hot water supply system can be efficiently controlled. According to the anomaly occurrence, operating time of the priority device etc. another water heater is set as the priority device; thus, the hot water supply operation is not interrupted and the convenience thereof can be enhanced. Since the management information of each water heater connected in the hot water supply system is also moved to the new priority device when the priority device is changed, the continuous hot water supply operation can be performed.

Advantages and Features of First, Second and Third Embodiments (1) This hot water supply system 2 is the multi unit system of linking a plurality of the water heaters 4, each of which can be used solely. Each control device 8 has a management function and a function to be managed. One water heater is set for the priority device from a plurality of these water heaters. The water heater that is set for the priority device manages the hot water supply system 2. According to such a structure, the hot water supply system of linking a plurality of water heaters can be established with a simple constitution.

(2) The priority device is not fixed to the specific water heater. The priority device is exchanged among the water heaters connected in the hot water supply system 2.

(3) Giving a device number for identifying and managing each water heater connected in the hot water supply system 2 is performed by the priority device, and a presetting is not necessary. That is, if the master setting is performed only for a water heater, which is to be the priority device, when a power source is turned on, each water heater can be automatically identified. Thereby, for example, the priority device can continuously monitor a water heater that starts its operation during the hot water supply operation. A setting work etc. after installation can also be reduced when, for example, a water heater is newly added.

(4) A water heater which is set for the priority device increases or decreases the number of the operating water heaters based on the increase or decrease of its own flow rate, and can adjust the supply of hot water in whole of the hot water supply system. Thereby, the hot water supply is performed with the proper hot water supply capacity of each water heater and the reduction of energy consumption can be achieved. Furthermore, a heavy load for a part of the water heaters can be prevented.

(5) This hot water supply system 2 can manage the hot water supply of the large capacity with the simple constitution without providing a control device such as the connection unit individually.

(6) Since the priority device is changed among the operating water heaters, the hot water supply operation of the hot water supply system can be maintained even if an anomaly occurs to a part of the water heaters.

Other Embodiments (1) In the process of the management of switching the number of the operating water heaters in the above embodiment (FIG. 14), for example, the flow sensor 72 disposed in the water supply pipe 7 of the first water heater 100 monitors the incoming water flow to the water heater 4. The disclosure is not limited thereto. For example, in the hot water supply system 2, the flow rate may be monitored by measuring the incoming water flow to each operating water heater 41, 42, 43 . . . .

(2) In monitoring the flow rate in the hot water supply system 2, an object to be monitored is not limited to the incoming water flow to the water heater 4. For example, the outgoing hot water flow may be measured. In this case, for example, the flow sensor may be provided at the hot water outgoing pipe 13 of each water heater 41, 42, 43 . . . .

According to the hot water supply system, water heater and hot water supply control method of the above embodiments, any of the following effects can be obtained.

(1) A part of the water heaters which constitute the hot water supply system is set for the first water heater which is the priority device, and the hot water supply operation is performed by other water heaters linked to the first water heater. Thus, simplification of the control device can be achieved.

(2) The number of the operating water heaters is controlled according to the information detected by the priority device. Thus, the operation of the hot water supply system can be efficiently controlled.

(3) According to the anomaly occurrence, operating time of the device, etc., another water heater is set for the priority device. Thus, the hot water supply operation is not interrupted and the convenience thereof can be enhanced.

(4) Since the management information of each water heater connected in the hot water supply system is also moved when the priority device is changed, the continuous hot water supply operation can be performed.

(5) The priority device gives a device number to each water heater connected in the hot water supply system. Thus, it is not necessary to provide a management device separately, and all water heaters can be managed identifiably.

While the embodiments have been described hereinabove, the present invention is not limited to the above description, and it is a matter of course that various variations and modifications can be made by those skilled in the art within the scope of the claims without departing from the spirit of the invention disclosed herein, and needless to say, such variations and modifications are also encompassed in the scope of the present invention.

In the present invention, one water heater, which constitutes the hot water supply system, is defined as the control device. This water heater manages other water heaters, and controls the operation of the other water heaters and stop thereof. Thus, simplification of the structure is achieved. Maintaining the hot water supply operation is also achieved by a control function thereof being made to be changeable to the other water heaters. Thus, the present invention is useful.

What is claimed is:

1. A hot water supply system comprising:
    a water supply pipe;
    a hot water supply pipe;
    a plurality of water heaters that are connected to the water supply pipe and the hot water supply pipe, one of the water heaters being designated as a master and one or more water heaters other than the water heater designated as the master being designated as one or more slaves;
    a control unit that is provided for each of the water heaters;
    a flow adjustment valve that is provided for each of the water heaters, the flow adjustment valve adjusting a flow rate of water; and
    a flow sensor that is provided for each of the water heaters, the flow sensor detecting a flow of incoming water,
    wherein each control unit is capable of operating a water heater for which it is respectively provided as the master or the slave,
    wherein information as to the flow of the incoming water detected by each flow sensor is inputted into the control unit being provided for the water heater for which said each flow sensor is respectively provided,
    wherein the control units each execute and control hot water supply of the water heaters for which they are provided respectively by occurrence of the flow of the incoming water,
    wherein the control unit provided for the water heater designated as the master transmits a first command to the water heater designated as the slave, and opens the flow adjustment valve provided therein to operate the water heater whose the flow adjustment valve opens when the flow of the incoming water through the water heater designated as the master is over a first set value,
    wherein the control unit provided for the water heater designated as the master selects an operational water heater by using operating times of the water heaters to stop the selected operational water heater when the flow of the incoming water through the water heater designated as the master is smaller than a second set value being smaller than the first set value; transmits a second command to the selected operational water heater to close the flow adjustment valve provided therein when the water heater designated as the slave is selected; and closes the flow adjustment valve provided for the water heater designated as the master, and passes a designation of the master to the water heater designated as the slave or one of the water heaters designated as the slaves when the water heater designated as the master is selected, and
    wherein the passing the designation of the master includes selecting one of operational water heaters by using the operating times of the water heaters, changing the water heater designated as the master to the slave, and transmitting a third command to the one of the operational water heaters to change the one of the operational water heaters to the master.

2. The hot water supply system of claim 1, wherein the control unit provided for the water heater designated as the master increases the number of operational slaves by transmitting the first command or decreases the number of the operational slaves by transmitting the second command.

3. The hot water supply system of claim 1, comprising at least a first water heater and a second water heater,
    wherein the first water heater is set as the master and the second water heater is set as the slave in initial setting of the hot water supply system.

4. The hot water supply system of claim 1, wherein
    the flow adjustment valve that adjusts a supply of hot water, and
    the flow adjustment valve is switched between an opened state and a closed state, to supply the hot water according to the hot water request.

5. A water heater of a hot water supply system including a plurality of water heaters, the water heater being designated as a master or a slave and comprising:
    a control unit whose control function is selectable in functioning as the master and functioning as the slave, the control unit operating the water heater as the master or the slave;
    a flow adjustment valve that adjusts a flow rate of water; and
    a flow sensor that detects a flow of incoming water,
    wherein the control unit executes and controls hot water supply of the water heater by occurrence of the flow of the incoming water,
    wherein the control unit whose a function as the master is selected transmits a first command to another water heater of the hot water supply system, and opens a flow adjustment valve of the other water heater to operate the other water heater, the flow adjustment valve adjusting the flow rate of water, when the flow of the incoming water detected by the flow sensor of the water heater is over a first set value,
    wherein the control unit whose the function as the master is selected selects an operational water heater by using operating times of the water heaters to stop the selected operational water heater when the flow of the incoming water detected by the flow sensor is smaller than a second set value being smaller than the first set value; transmits a second command to the selected operational water heater to close the flow adjustment valve of the selected operational water heater when the other water heater is selected; and closes the flow adjustment valve of the water heater, and passes a designation of the master to one of the water heaters when the water heater is selected, and
    wherein the passing the designation of the master includes selecting one of the operational water heaters by using the operating times of the water heaters, changing the water heater to the slave, and transmitting a third command to the one of the operational water heaters to change the one of the operational water heaters to the master.

6. The water heater of claim 5, wherein the flow adjustment valve is switched between an opened state and a closed state to supply hot water according to a hot water request.

7. A method for controlling hot water supply, the hot water supply being performed by a plurality of water heaters, the method comprising:

designating one of the water heaters as a master, and designating one or more water heaters other than the water heater designated as the master as one or more slaves;

operating, by a control unit, each of the water heaters as the master or the slave, the control unit being provided for each of the water heaters;

transmitting, by the control unit being provided for the water heater designated as the master, a first command to the water heater designated as the slave, and opens a flow adjustment valve provided for the water heater designated as the slave to operate the water heater whose the flow adjustment valve opens, the flow adjustment valve adjusting a flow rate of water, when the flow of the incoming water through the water heater designated as the master is over a first set value;

selecting, by the control unit provided for the water heater designated as the master, an operational water heater by using operating times of the water heaters to stop the selected operational water heater when the flow of the incoming water through the water heater designated as the master is smaller than a second set value being smaller than the first set value; transmitting, by the control unit provided for the water heater designated as the master, a second command to the selected operational water heater to close the flow adjustment valve provided therein when the water heater designated as the slave is selected; and closing, by the control unit provided for the water heater designated as the master, the flow adjustment valve provided for the water heater designated as the master, and passing, by the control unit provided for the water heater designated as the master, a designation of the master to the water heater designated as the slave or one of the water heaters designated as the slave when the water heater designated as the master is selected; and executing and controlling the hot water supply of the master and the hot water supply of the one or more slaves by occurrence of a flow of incoming water with the control unit respectively provided therefor, respectively wherein the passing the designation of the master includes selecting one of operational water heaters by using the operating times of the water heaters, changing the water heater designated as the master to the slave, and transmitting a third command to the one of the operational water heaters to change the one of the operational water heaters to the slave.

* * * * *